United States Patent
Dengler et al.

(10) Patent No.: US 7,116,342 B2
(45) Date of Patent: Oct. 3, 2006

(54) SYSTEM AND METHOD FOR INSERTING CONTENT INTO AN IMAGE SEQUENCE

(75) Inventors: John D. Dengler, Durham, NC (US); Erik J. Garci, Durham, NC (US); Brian C. Cox, Durham, NC (US); Kenneth T. Tolman, Durham, NC (US); Hans X. Weber, Chapel Hill, NC (US); Gerard J. Hall, Durham, NC (US)

(73) Assignee: Sportsmedia Technology Corporation, Durham, NC (US)

( * ) Notice: Subject to any disclaimer, the term of this patent is extended or adjusted under 35 U.S.C. 154(b) by 284 days.

(21) Appl. No.: 10/613,273

(22) Filed: Jul. 3, 2003

(65) Prior Publication Data

US 2005/0001852 A1   Jan. 6, 2005

(51) Int. Cl.
*G09G 5/00* (2006.01)
*H04N 9/74* (2006.01)

(52) U.S. Cl. ............. 345/630; 345/632; 345/633; 345/619; 348/584

(58) Field of Classification Search ......... 345/629–633
See application file for complete search history.

(56) References Cited

U.S. PATENT DOCUMENTS

| | | | |
|---|---|---|---|
| 4,084,184 A | | 4/1978 | Crain |
| 5,264,933 A | | 11/1993 | Rosser et al. |
| 5,353,392 A | | 10/1994 | Luquet et al. |
| 5,436,672 A | * | 7/1995 | Medioni et al. ............ 348/591 |
| 5,491,517 A | * | 2/1996 | Kreitman et al. ........... 348/581 |
| 5,515,485 A | | 5/1996 | Luquet et al. |
| 5,564,698 A | * | 10/1996 | Honey et al. ............... 473/570 |
| 5,566,251 A | | 10/1996 | Hanna et al. |
| 5,602,937 A | * | 2/1997 | Bedrosian et al. .......... 382/151 |
| 5,627,915 A | | 5/1997 | Rosser et al. |
| 5,808,695 A | * | 9/1998 | Rosser et al. ............... 348/584 |
| 5,862,517 A | | 1/1999 | Honey et al. |
| 5,892,554 A | * | 4/1999 | DiCicco et al. ............ 348/584 |
| 5,903,317 A | | 5/1999 | Sharir et al. |
| 5,912,700 A | * | 6/1999 | Honey et al. ............... 348/157 |
| 5,917,553 A | | 6/1999 | Honey et al. |
| 6,100,925 A | | 8/2000 | Rosser et al. |
| 6,141,060 A | | 10/2000 | Honey et al. |
| 6,154,250 A | | 11/2000 | Honey et al. |
| 6,181,345 B1 | | 1/2001 | Richard |
| 6,201,579 B1 | * | 3/2001 | Tamir et al. ................ 348/579 |
| 6,208,386 B1 | | 3/2001 | Wilf et al. |
| 6,229,550 B1 | | 5/2001 | Gloudemans et al. |

(Continued)

OTHER PUBLICATIONS

Heckbert, Paul S., Fundamentals of Texture Mapping and Image Warping, master's thesis, Jun. 17, 1989, pp. 17-21, Dept. of Electrical Engeering and Computer Science, University of California, Berkeley, CA.

(Continued)

*Primary Examiner*—Michael Razavi
*Assistant Examiner*—Eric Woods

(57) ABSTRACT

A real-time system and method for inserting perspective correct content into an image sequence are presented. The invention inserts the content with the location, size, orientation, shape and occlusion properties that are appropriate for the camera view represented by the image sequence. Both static and dynamic content insert positions are supported. The location, size, orientation and shape of the inserted content are determined independently of the image sequence content. Furthermore, no knowledge of three dimensional real world space locations or real world measurements, as related to the content of the image sequence, is used during the content insert process.

38 Claims, 13 Drawing Sheets

U.S. PATENT DOCUMENTS

| | | |
|---|---|---|
| 6,252,632 B1 | 6/2001 | Cavallaro |
| 6,266,100 B1 | 7/2001 | Gloudemans et al. |
| 6,292,227 B1 | 9/2001 | Wilf et al. |
| 6,304,298 B1* | 10/2001 | Steinberg et al. ............ 348/587 |
| 6,373,508 B1* | 4/2002 | Moengen ..................... 715/848 |
| 6,384,871 B1* | 5/2002 | Wilf et al. .................. 348/578 |
| 6,597,406 B1 | 7/2003 | Gloudemans et al. |
| 6,750,919 B1* | 6/2004 | Rosser ....................... 348/584 |
| 2001/0031067 A1* | 10/2001 | Kennedy et al. ............ 382/103 |
| 2002/0191837 A1* | 12/2002 | Takeda et al. ................ 382/154 |
| 2003/0100364 A1* | 5/2003 | Mori ........................... 463/30 |
| 2003/0197660 A1* | 10/2003 | Takahashi et al. ............. 345/7 |
| 2005/0010875 A1* | 1/2005 | Darty et al. ................. 715/768 |
| 2005/0104964 A1* | 5/2005 | Bovyrin et al. ............. 348/155 |

OTHER PUBLICATIONS

Wilson, Reg G., Modeling and Calibration of Automated Zoom Lenses, Ph.D. dissertation, Jan. 1994, pp. 85-121, The Robotics Institute, Carnegie Mellon University, Pittsburgh, PA.

* cited by examiner

SYSTEM AND METHOD FOR INSERTING CONTENT INTO AN IMAGE SEQUENCE

FIELD OF THE INVENTION

The present invention is directed to a system and method for augmenting an image sequence with content, such that the content appears to have been part of the original scene as displayed by the image sequence.

NOTATIONS AND NOMENCLATURE

This section will present a subset of the nomenclature which is relevant to the domain of the present invention. Precise definition of these terms will aid the reader in correct interpretation of this document. Take note that many of these terms have been used in a different or inconsistent fashion within previously published descriptions of prior art. Despite this, these terms will be used consistently throughout this document, according to the Glossary contained herein.

AUGMENTED REALITY (AR)—the virtual augmentation of a real world physical environment (scene) for the purpose of indirect (video or other) display to a viewer, such that said augmentation appears to belong within the real world. For example, an advertisement may be added to the television display of a blank baseball outfield wall. From all possible camera views, this advertisement will appear, to the television viewer, to be painted onto the outfield wall.

AUGMENTED REALITY INSERT (AR INSERT)—a rendered graphic placed into a camera view which allows for creating the illusion that the rendered graphic is indeed part of the real world scene being displayed.

BACKGROUND—the portion of the scene intended to be covered by the AR insert. The background typically includes, but is not limited to, unchanging parts of the physical scene; e.g., the playing field, bleachers, etc.

COLOR SEPARATION—the process of determining what is foreground and what is background within a displayed scene. Typically, an AR insert is drawn on top of the background elements, but underneath the foreground elements; thus giving the impression that the object is indeed part of the background within the scene.

COLOR SEPARATOR—the portion of an AR system that implements the color separation method.

FOREGROUND—the portion of the scene intended to appear in front of the AR insert. The foreground typically includes, but is not limited to, moving parts of the physical scene; e.g., players, referees, yard markers, swirling leaves, fans, etc.

GRAPHICS FRAME BUFFER (GFB)—a two dimensional buffer which stores pixel data content, where pixel data content is typically in the form of RGBA (red-green-blue-alpha) information.

INDUCTIVE TRANSFORM—the transformation function used by the view modeler for the purpose of converting a point P[a] within view A to point P[b] within different view B, such that P[a] and P[b] identify the same location within real world space.

REAL WORLD SPACE—the three dimensional physical space of the scene. Dimensions within real world space represent real world scale units of physical measurements, such as those measured relative to the location of the broadcast camera. The units of measurement within the real world space coordinate system are required to be real world units, such as millimeters, feet, etc.

SCENE—the actual, physical real world environment which is displayed.

SCENE COMPONENT—a portion of the scene, defined due to its significance with respect to the actual broadcast coverage of the event. For example, during a football game, the football field may be defined as a scene component. A three-dimensional model representation of a scene component is referred to as a scene component model (SCM).

VIEW—the image of a scene, as generated by a specific camera. The view of a scene is determined by the placement and orientation of the camera relative to the scene, as well as intrinsic parameters of the camera, such as radial distortion of the camera lens. The term "camera view" is used synonymously with "view" throughout this document.

VIEW MODELING—the process of determining and representing the perspective and display characteristics associated with the camera view, for the purpose of realistically rendering AR inserts into that view.

VIEW MODELER—the portion of an AR system that implements the view modeling method.

In the remainder of this document, please refer to the Glossary section for clarification of domain specific nomenclature.

BACKGROUND OF THE INVENTION

Today, there exist multiple examples of AR inserts within the domain of broadcast television. For example, a staple of many current television broadcasts of football games in the U.S. is the display of a virtual line on the playing field which encompasses the yard line which the offensive team must cross in order to achieve a first down. Another example of an AR insert during a sports broadcast is the placement of virtual advertisements into the stadium or arena where the game is being played. For example, during the television broadcast of a baseball game, a virtual advertising billboard may be placed onto the backstop behind home plate. The content of these virtual advertisements will typically be changed each inning in order to support multiple sponsors during the game. Another common example of an AR insert, within the domain of news broadcasts, is the creation of a virtual studio. Virtual studios typically involve the display of walls, desks, screens, and other studio equipment around a newscaster in order to give the impression that a full studio set has been constructed.

It should be noted that the overlay of an AR insert onto either static or moving objects is supported by the present invention. For example, a logo may be placed onto the hood of a moving car during an automobile race. The display of such a moving AR insert requires a system and method to support dynamic motion throughout the scene. The present invention includes such a method.

Referring to the Glossary section above, real world space is defined as the three dimensional physical space of the scene. Locations (coordinates) are defined within real world space, such as coordinates relative to the location of the broadcast camera. The units of measurement within the real world space coordinate system are required to be real world units, such as match with definition millimeters, feet, etc. A view modeling method may be considered "real world space dependent" if the method depends on knowledge of any locations or measurements within real world space; i.e., in real world units in the x, y and z directions, such as those relative to the camera.

The problems with a real world space dependent view modeling approach are related to the fact that both collecting and maintaining three dimensional real world space location and measurement information is often an imposing or even impractical task. With respect to the area of information collection, the gathering of highly accurate real world location and measurement information often involves the usage of specialized and expensive equipment, such as GPS systems, survey equipment, laser planes, or inertial navigation systems (e.g., see U.S. Pat. No. 4,084,184 to Crain and U.S. Pat. No. 6,266,100 to Gloudemans, et al.). The usage of such equipment implies that special training must be given to technicians who will be setting up and calibrating this equipment on-site at the broadcast venue. This limits the usefulness of such AR systems when used within a broadcast environment where television personnel who have not received special training will be required to set up and operate the AR system. Furthermore, the gathering of location and measurement information using such equipment is often time consuming. This means that AR systems which depend on this equipment may be impractical within a television broadcast setup environment where production costs have been trimmed by limiting on-site setup time for the television crew.

Maintenance of location and measurement information is also a problem with a real world space dependent view modeling approach. Consider a situation where the camera is accidentally moved (e.g., bumped by the operator) during a broadcast. Since, as discussed above, knowledge of the location of the camera relative to objects within the scene in three dimensional real world space is a required element of a real world space dependent solution, it will be required at that point to entirely reassess and recalibrate the location of the camera and perhaps any other required objects within the scene. This is potentially a very time consuming process, and may likely be impractical during an actual live event. In an analogous situation, the camera may be deliberately moved either just before, or during a broadcast in order to obtain a better view of the event. This situation presents similarly dire consequences to the real world space dependent view modeling method, as well.

An early method for view modeling that is based solely on camera sensor data is presented within U.S. Pat. No. 4,084,184 to Crain. Crain presents a method for transforming the location of an object within three dimensional real world space into a set of values which represent the location of the object within a TV raster signal generated by a camera. The following information is required to be known for the Crain method to function: (a) the precise three dimensional real world space location of the camera, (b) the precise three dimensional real world space location of the object, and (c) pan, tilt and zoom values for the camera. Means for (a) is stated to be an inertial navigation system, while means for (b) is stated to be a set of surveying instruments. Pan, tilt and zoom information is obtained via sensors attached to a broadcast camera. Given (a) and (b), it is obvious that the view modeling method disclosed in Crain is real world space dependent, and thus exhibits the general real world space dependency problems that were outlined within the previous section above. The view modeling methodology within the present invention addresses all of these problems due to the fact that the present methodology is real world space independent.

Another method for view modeling is presented within U.S. Pat. No. 6,266,100 to Gloudemans, et al. This method relies on the use of pan, tilt and zoom data originating from sensors attached to a broadcast camera, in combination with a three dimensional model of the scene. The method is real world space dependent due to the fact that three dimensional locations of objects within the environment space are measured, computed and utilized within the method. The preferred embodiment described in Gloudemans, et al. determines the location of the camera by (a) determining the real world space locations of at least three "fiducials" (landmarks), using a laser plane or other suitable method, (b) pointing the optical center of the camera to these landmarks and (c) using geometric equations, based on recorded pan, tilt and zoom values, to calculate the (x,y,z) location of the camera. Thus, due to this real world space dependency, the method also exhibits the general real world space dependency problems that were outlined within the previous section above.

Other real world space dependent view modeling methods within the prior art include: U.S. Pat. No. 6,384,871 to Wilf et al., U.S. Pat. No. 5,912,700 to Honey, et al., U.S. Pat. No. 6,154,250 to Honey, et al., U.S. Pat. No. 6,100,925 to Rosser, et al., U.S. Pat. No. 6,208,386 to Wilf, et al., and U.S. Pat. No. 6,201,579 to Tamir, et al., each of which is incorporated by reference herein.

The present invention addresses these real world space dependent view modeling issues by offering a real world space independent view modeling approach.

Many view modeling methods within the prior art are based on pattern recognition techniques. These pattern recognition based view modeling methods have many potential drawbacks. Distortion of the video signal, occlusion of landmarks (due to foreground activity within the scene), and changing environmental conditions (which may affect the appearance of landmarks) each may dramatically decrease view modeling accuracy. Delays due to significant processing overhead may also occur.

One example of a pattern recognition based view modeling method is presented within U.S. Pat. No. 5,808,695 to Rosser, et al. Pattern recognition techniques are used to track the motion of an object within a camera view. Template correlation is used to track fixed (background) landmarks within the camera view in order to provide positional information for objects within the camera view. The algorithms that comprise the method utilize only two dimensional camera view space; thus, the method appears to be real world space independent. However, since the method is based on pattern recognition, the problems listed above may occur.

Other pattern recognition based view modeling methods include those described in: U.S. Pat. No. 6,384,871 to Wilf, et al., U.S. Pat. No. 5,912,700 to Honey, et al., U.S. Pat. No. 6,154,250 to Honey, et al., U.S. Pat. No. 6,100,925 to Rosser, et al., U.S. Pat. No. 6,208,386 to Wilf, et al., U.S. Pat. No. 6,201,579 to Tamir, et al., U.S. Pat. No. 5,808,695 to Rosser, et al., U.S. Pat. No. 5,892,554 to DiCicco, et al., U.S. Pat. No. 5,627,915 to Rosser, et al., U.S. Pat. No. 5,903,317 to Sharir, et al., U.S. Pat. No. 5,264,933 to Rosser, et al., U.S. Pat. No. 5,436,672 to Medioni, et al., U.S. Pat. No. 5,515,485 to Luquet, et al., U.S. Pat. No. 6,181,345 to Richard, U.S. Pat. No. 6,304,298 to Steinberg, et al., U.S. Pat. No. 5,917,553 to Honey, et al., and U.S. Pat. No. 6,141,060 to Honey, et al., each of which is incorporated by reference herein.

The present invention addresses these pattern recognition issues by offering a view modeling solution which does not utilize any pattern recognition techniques.

SUMMARY OF THE INVENTION

Please refer to the Glossary section for clarification of domain specific nomenclature.

The primary functional goal of the present invention is to provide a robust system and method for the placement of one or more AR inserts into a video stream, using a set of techniques which allow each of these AR inserts to (a) be dynamically updated with new content via any traditional graphics frame buffer based rendering device and/or software, and (b) dynamically move throughout the scene. The present invention contains unique and effective solutions to the problems of color separation and view modeling. Finally, a preferred embodiment of the present invention may use the integration of a television timecode so that AR inserts can not only be placed within a scene displayed by a live camera, but also within a scene which has been captured earlier, and subsequently accessed again, via a video recorder, for replay purposes.

Beyond the functional goals, a preferred embodiment of the present invention also fulfills multiple practical goals. First of all, a preferred embodiment of the present invention provides for a solution which is characterized by a relatively fast and easy pre-event setup, when executed within a typical broadcast television setting. This is achieved via a calibration process which is broken up into a set of both off-site (scene independent) and on-site (scene dependent) steps. The most time consuming portions of system calibration are scene independent in nature; thus, the on-site setup phase may typically be completed in a relatively short amount of time. Finally, problems which typically occur on-site during an event (e.g., the camera is moved from it's original position) are also handled quickly and robustly within a preferred embodiment.

The present invention is a general purpose system and method for embedding AR based graphic content into an image sequence. The invention is considered general purpose based on the fact that it allows for seamless integration into most common television production environments. This is because a preferred embodiment of the invention utilizes, and will interface in an industry standard manner with, other devices typically contained within a television production environment.

The present invention preferably allows for a generic device called a character generator (CG) to be used to generate real-time graphic content for display within the scene portrayed within a view. Essentially, this means that any one of a set of industry standard CG devices may be used, within a preferred embodiment, for the purpose of creating real-time graphic content for AR inserts. This real-time graphic content is created independently of the system and method that are used to create the AR insert. In other words, the display of graphics with correct size, orientation, perspective and occlusion within the scene is achieved through a completely independent system and method.

The fact that any device capable of generating graphic content may be utilized within the present invention implies that "plugging" this invention into an already existing television production environment is very practical. This is because one or more CG's typically already exist within almost every existing live or post-production television environment. Utilization of an existing CG within one of these production environments has a profound effect on the flexibility and general utility of the AR insert system. First of all, familiar and powerful CG tools that are typically used only for creating traditional (non-AR) graphics for a television broadcast will now be available for usage in creating content for AR inserts. Secondly, all elements (e.g. sponsor logos, network identifying backgrounds, fonts, animations) that are normally loaded and available for building graphic content for traditional, non-AR graphics, will now be available for AR inserts, as well.

It should be noted that an optional embodiment of the present invention may also use a non-generic, non-industry standard CG device and software application. Or, optionally, a more customized CG device and software application may be utilized for the purpose of creating highly specialized graphic content that requires (a) a customized user interface for creation and management of the graphic content, (b) a preferred, proprietary method of transferring the graphic pixel content into the GFB, and/or (c) a higher degree of communication and general interaction between the CG and the AR insert system.

A preferred embodiment of the present invention is synchronized with a television timecode so that the system can be utilized with live camera input video, as well as with replay video from a video recorder. This synchronization may be used within both a live and post-production television environment. To accomplish this functionality, the system utilizes a real-time data logging and time-stamping sub-module which synchronously archives AR insert location data, input camera sensor data, and input camera video, with all data indexed according to television timecode. When video is played back, a preferred embodiment of the present invention will automatically index, using timecode from the video recorder, into this archive to retrieve the originally saved data. This allows for the optional presentation of AR inserts within the replay video.

The power of this television timecode driven system is that usages for AR inserts may be envisioned and utilized in replay or post-production that were not possible to envision within the original live situation. For example, suppose a multiple car wreck occurs during an automobile race. During a replay of the racing leading up to the wreck, a television production of that race could use a preferred embodiment of the present invention in order to place dynamically moving highlights on the hoods of the cars that were involved in the wreck. Analysis of the movement of these cars during the replay could be done, accentuated by highlights on the cars involved in order to facilitate the analysis.

The system and method described herein contains a novel view modeling technique which is powerful, easy to set up, robust and practical within a typical television broadcast environment. No knowledge of real world space locations or measurements (such as those relative to the location of the broadcast camera) is required within the present view modeling method. This means that setup is simplified, and time requirements for setup are decreased significantly. This is because the usage of specialized equipment and time consuming procedures for finding and measuring landmarks within the scene, such as those relative to the camera, is not required. Furthermore, recovery time required after either inadvertent or deliberate relocation of the camera (which can occur just before, or during the broadcast) is also decreased significantly.

One preferred embodiment of the present invention will simultaneously support multiple image input sources and multiple graphics frame buffers. Each graphics frame buffer within this embodiment may be independently filled with graphic pixel data, and subsequently placed within one or more of the image input streams. The set of image input sources may contain a combination of live broadcast cameras and digital and/or analog video recorders.

The text within this document generally discusses a single input/output system with a single graphics frame buffer. It should be noted, however, that the present invention may also accommodate (a) multiple input image streams, (b) multiple output image streams, and (c) multiple graphics frame buffers.

Thus, in accordance with a preferred embodiment of the present invention, a method of placing content into an image sequence includes the steps of applying a transform function to visual content to be inserted into an image sequence, and blending the transformed visual content with the image sequence. The transforming step and the blending step together result in insertion of the content into the image sequence such that the content appears at a target location as if it had been part of the original scene displayed by the image sequence. The transforming step includes all applied geometric transformations of the visual content, is performed without reference to any content of the image sequence, and is performed without reference to any three dimensional real world space locations or dimensions such as the location of the camera that produced the image sequence. Optionally, the content may be placed on a moving object in the image sequence and displayed on the moving object as the object moves in the scene. Also optionally, the content may include dynamically changing content.

In accordance with an alternate embodiment, a method of placing a virtual marker line or a virtual sign into an image sequence includes the steps of applying a transform function to a marker line or virtual sign that is to be inserted into an image sequence that was produced by a camera and blending the transformed line or transformed sign with the image sequence. The transforming step and the blending step together result in insertion of the line into the image sequence such that the line appears at a target location as if it had been part of the original scene displayed by the image sequence. Also, the transforming step includes all applied geometric transformations of the line, is performed without reference to any real-time content of the image sequence, and is performed without reference to any location of the camera.

In accordance with a preferred embodiment, a method of transforming a first point P[A] within a first two-dimensional camera view to a second point P[B] within a second two-dimensional camera view ensures that point P[A] corresponds to the same location within real world space as point P[B]. The method includes the application of a transform function to transform point P[A] within a first image to point P[B] within a second image. The first image contains content related to a first camera view and the second image contains content related to a second camera view. In real world space, point P[A] corresponds to the same location within real world space as point P[B], but the points do not necessarily appear in the same location in camera view space. The transforming step is performed without reference to any content of the first image and the second image. The transforming step is also performed without reference to any three-dimensional real world space locations or dimensions as related to the content of the first image and the second image.

It is to be understood that the invention is not limited in its application to the details of construction and to the arrangements of the components set forth herein or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be used as a basis for designing other structures, methods and systems for carrying out the several purposes of the invention. Thus, the invention is not limited to the exact construction and operation illustrated and described, and accordingly all appropriate modifications and equivalents may fall within the scope of the invention.

DETAILED DESCRIPTION OF PREFERRED EMBODIMENTS OF THE INVENTION

A preferred embodiment of the present invention is intended to be useful within both a live broadcast television production setting, as well as a post production broadcast television setting. Furthermore, a preferred embodiment of the present invention requires a setup phase to allow calibration of camera sensors, as well as derivation of various parameters and data structures associated with the view modeling and color separation methods. Thus, two different operating modes are associated with the present invention— (1) Setup, and (2) Production. We will now describe, in detail, the fundamental concepts, usage paradigms, and preferred implementations of the invention within the context of each of these operating modes, referring to the figures for illustration.

1. Setup

During the setup phase of a preferred embodiment of the present invention, seven primary steps are typically performed: (A) setup, at a fixed location, a broadcast camera with attached camera sensors; (B) perform color separator calibration (training), which essentially derives all information necessary to perform effective color separation; (C) determine the fixed inductive transform parameters; (D) select the baseline image (view); (E) define the scene component model set; (F) define the set of scene component model insert regions within the baseline image; and (G) determine the baseline perspective transform for each scene component model.

1A. Camera Setup

Figure 1:
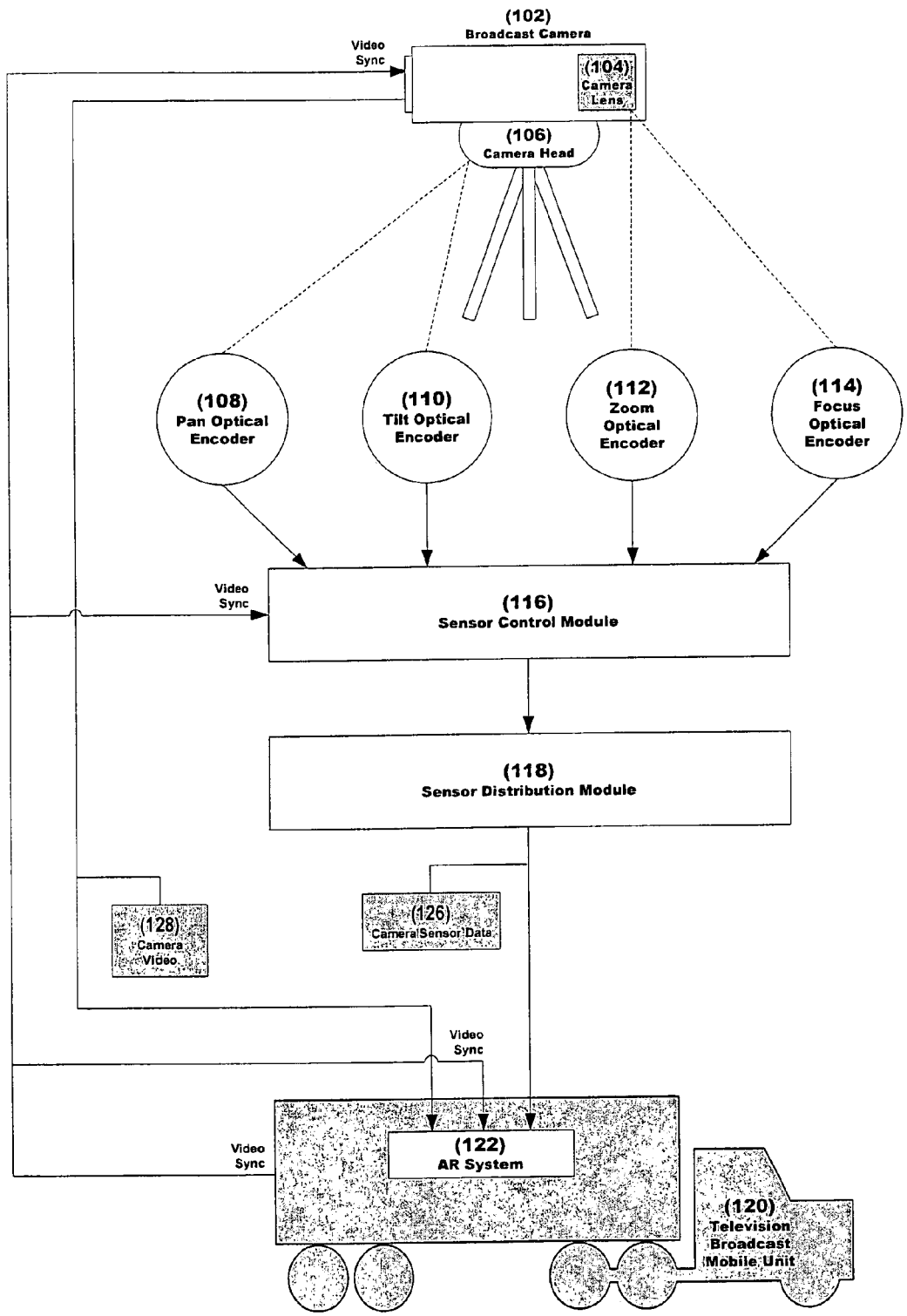
FIG. 1 is a schematic diagram which illustrates a live television broadcast camera setup within a preferred embodiment of the invention.

The view modeling method utilized within the present invention is based completely on the usage of camera sensor data. This camera sensor data gives the view modeler information regarding the current pan angle, tilt angle, zoom magnification and focus setting of the camera. Within a preferred embodiment, lens extender (doubler) data and iris closure data may also be utilized. This sensor information is then utilized by the view modeler to compute perspective based transforms that are necessary for properly rendering an AR insert into the view. Typically, a standard broadcast camera setup does not include these sensors. Referring to FIG. 1, the broadcast camera lens 104 and camera head 106 must be retrofitted appropriately. Furthermore, the sensor control module 116 and sensor distribution module 118 must typically also be added and integrated into the broadcast environment.

Continuing to refer to FIG. 1, a preferred embodiment of the present invention includes optical encoders for measurement of each of the pan, tilt, zoom and focus parameters. The pan optical encoder 108 and tilt optical encoder 110 are integrated into the camera head 106, while the zoom optical encoder 112 and focus optical encoder 114 are integrated into the camera lens 104. Each of these optical encoders maintains a count. These counts are periodically sampled by the sensor control module 116. After sampling, the sensor control module 116 interpolates each of the optical encoder counts according to a pre-defined interpolation function, and then creates a data packet which contains interpolated pan, tilt, zoom, and focus optical encoder counts. The sensor control module 116 then transmits this data packet to the sensor distribution module 118.

The sensor control module 116 receives a video sync signal from the television broadcast mobile unit 120 in order to allow synchronization of the periodic sampling of optical encoder counts with the refresh of camera video field data. The sensor control module 116 will know, given the video sync, when the broadcast camera 102 video field data is refreshed. Upon each refresh of video field data (approximately 60 Hz), the sensor control module 116 will sample, interpolate, package and transmit sensor data to the sensor distribution module 118. This means that the content of each sensor data packet will correspond, in time, with a specific field of video generated and transmitted by the broadcast camera 102.

There are multiple possible embodiments of the sensor distribution module 118. One embodiment involves distribution of the camera sensor data using a means which is independent of the means used for distribution of the camera video. Essentially, the camera sensor data and camera video are two completely independent data streams. This is the configuration shown in FIG. 1. The packetized camera sensor data stream, created by the sensor control module 116, is transmitted to the AR system 122 within the television broadcast mobile unit 120 via a long range transmission protocol (e.g., RS-422).

The major problem with the independent means distribution system is that the cabling and infrastructure necessary to carry the camera sensor data from the sensor distribution module 118 to the AR system 122 within the television broadcast mobile unit 120 is not typically a part of a standard on-site television production setup. Typically, the only cabling run to a camera position is for the purpose of the distribution of camera video, and also for verbal communication with the camera operator. The addition of further required cabling may have a relatively significant impact on the technical setup within a low budget production environment, where setup time is typically short. In order to solve this independent means distribution system problem, an alternative embodiment involves the sensor distribution module 118 transmitting the camera sensor data packets via the existing camera cabling infrastructure. For example, extra audio channels or serial data channels are often available, within the modulated signal, for such usage.

1B. Color Separator Training

The purpose of the color separator is to provide all information necessary for correct occlusion based rendering of the AR insert within the camera view. The color separator ensures that the AR insert is rendered in front of background objects, but behind foreground objects, within the input camera view. This is achieved by building and referencing a background color table which stores all colors which should be considered colors indicative of background objects within the scene. Within real-time operation, this "background inclusion table" is indexed in order to classify individual pixels within the input image as either background or foreground. This section will describe, in detail, the color separator training process which is used to derive this background inclusion table.

Figure 2:
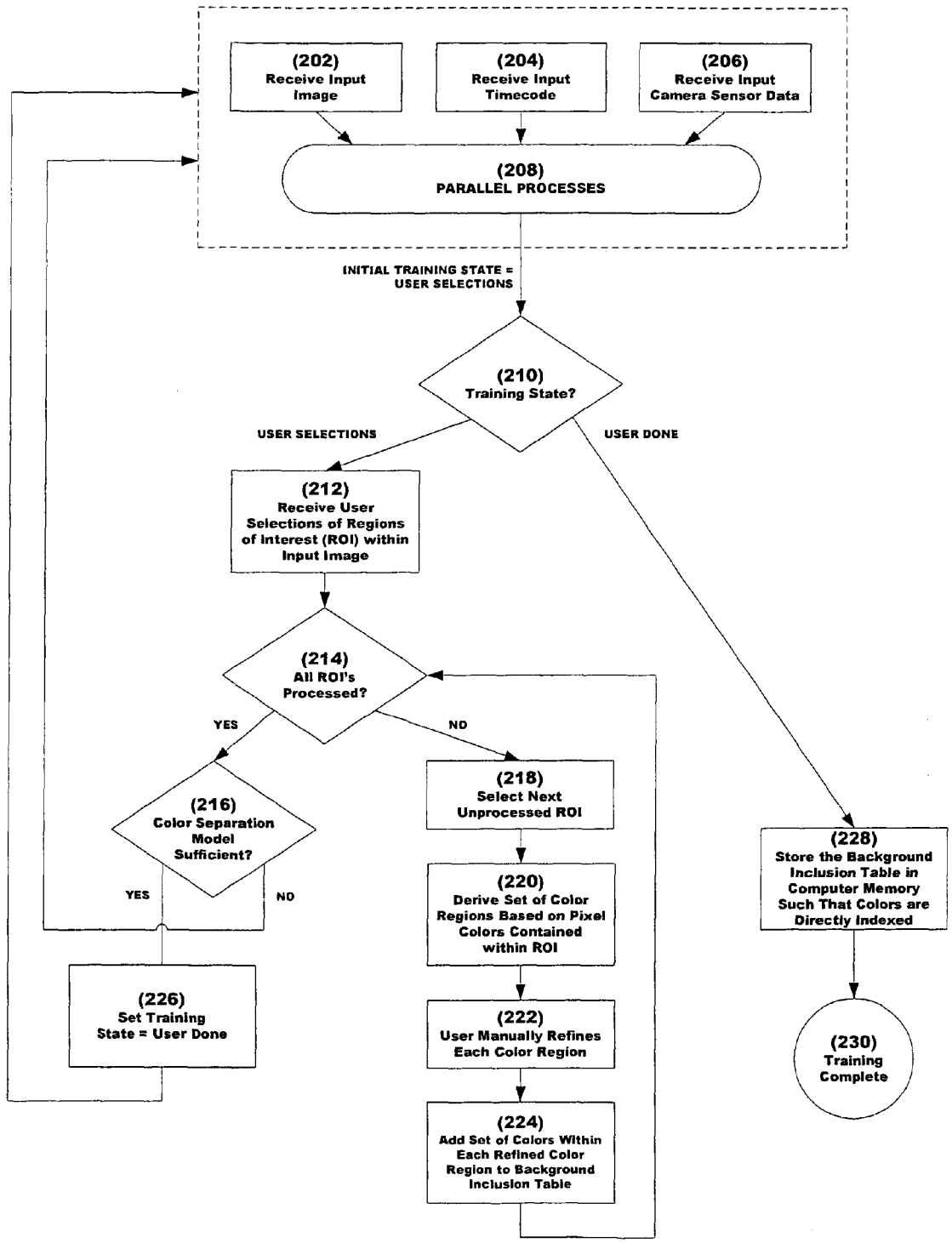
FIG. 2 is a process flow chart which illustrates a preferred method for generating a color separation model, suitable for use in classifying pixels within an image as either background or foreground.

FIG. 2 illustrates the process of deriving the background inclusion table. Within a preferred embodiment, the user will capture (using a suitable computerized digital capture means) a set of input images, choosing input images which contain regions of the scene which are considered background. For example, if a football game is the subject of the television broadcast, different sections of the football field will be within the captured image set. Other desired background objects, including benches, yard markers, etc., may also be within the captured image set. For each captured image, the following operations take place. First, the user selects 212 a set of "regions of interest" within the captured image. These regions of interest should contain pixel colors which are considered to be background colors. From each region of interest, a set of candidate "color regions" are derived 220 and subsequently displayed to the user. The user then has the option of manually refining 222 each of these color regions. Within a preferred embodiment, a graphical display of the color region within three dimensional color space would be available to the user. The user would be provided with selection, shaping, and painting type tools to manipulate the color region. Finally, the colors contained within each color region are added 224 to the background inclusion table.

The decision 216 regarding the sufficiency of the captured frame set is quite subjective, based on the user confidence that all background colors have been properly included. Within a preferred embodiment, graphical displays which show background coverage of user selected camera views are supplied in order to assist with this sufficiency decision. After the background inclusion table is completely built, the table is stored 228 in an optimized form, to allow fast indexing of colors during real-time usage. Within a preferred embodiment, the optimized form of the background inclusion table would be a hash table.

1C. Determining the Fixed Inductive Transform Parameters

The purpose of the view modeler is to provide all information (location, orientation, and size) necessary for perspective correct rendering of the AR insert within the camera view. The view modeler ensures that the AR insert looks natural at all times, with respect to perspective. Changes to the pan angle, tilt angle, zoom magnification and focus setting of the camera are tracked appropriately. Sensors are attached to the camera lens and camera head in order to provide this data to the AR system (see FIG. 1, as well as the preceding section). In order to correctly utilize this sensor information within a live or post production setting, the view modeler must be trained (calibrated) beforehand.

In order to understand the training of the view modeler, one first must understand the real-time (post-training) goals of the view modeler. Essentially, the view modeler, once trained, will know how to convert a point P[a] within two dimensional camera view A to a point P[b] within two dimensional camera view B, such that point P[a] and P[b] both correspond to the same location in real world space. This will hold true for all points within any possible camera view. Upon receipt of each input image within the image sequence, the view modeler will be asked to convert points from a pre-selected "baseline image" to points within the current input image. This conversion process will yield the point information necessary to properly render the AR insert into the current input image. One may refer to FIGS. 1, 8 and 9 for an illustration of this real-time transformation process. The transform function used to convert points from the baseline image to the input image will be referred to as the "inductive transform" throughout this document.

In order to achieve this functionality in real-time, the view modeler must, during the pre-event training process, derive a set of parameters (the "fixed inductive transform parameters") which determine (in combination with the "dynamic inductive transform parameters") the behavior of the inductive transform function, in real-time. It should be noted that this training step may actually take place "off-site" (i.e., not at the broadcast venue), given the fact that the view modeler is real world space independent. It is preferred, though, that the training conditions (i.e., distance from target) be at least roughly approximate to those expected at the broadcast venue itself. Though the view modeler does not utilize any real world space dimensions or locations, approximating conditions helps to maximize accuracy of the trained view modeler, when ultimately utilized at the broadcast venue. Note that the same equipment (camera, lens, head, and optical encoders) and configuration of equipment (mounting and calibration) must be used during training and at the broadcast venue.

Figure 3:
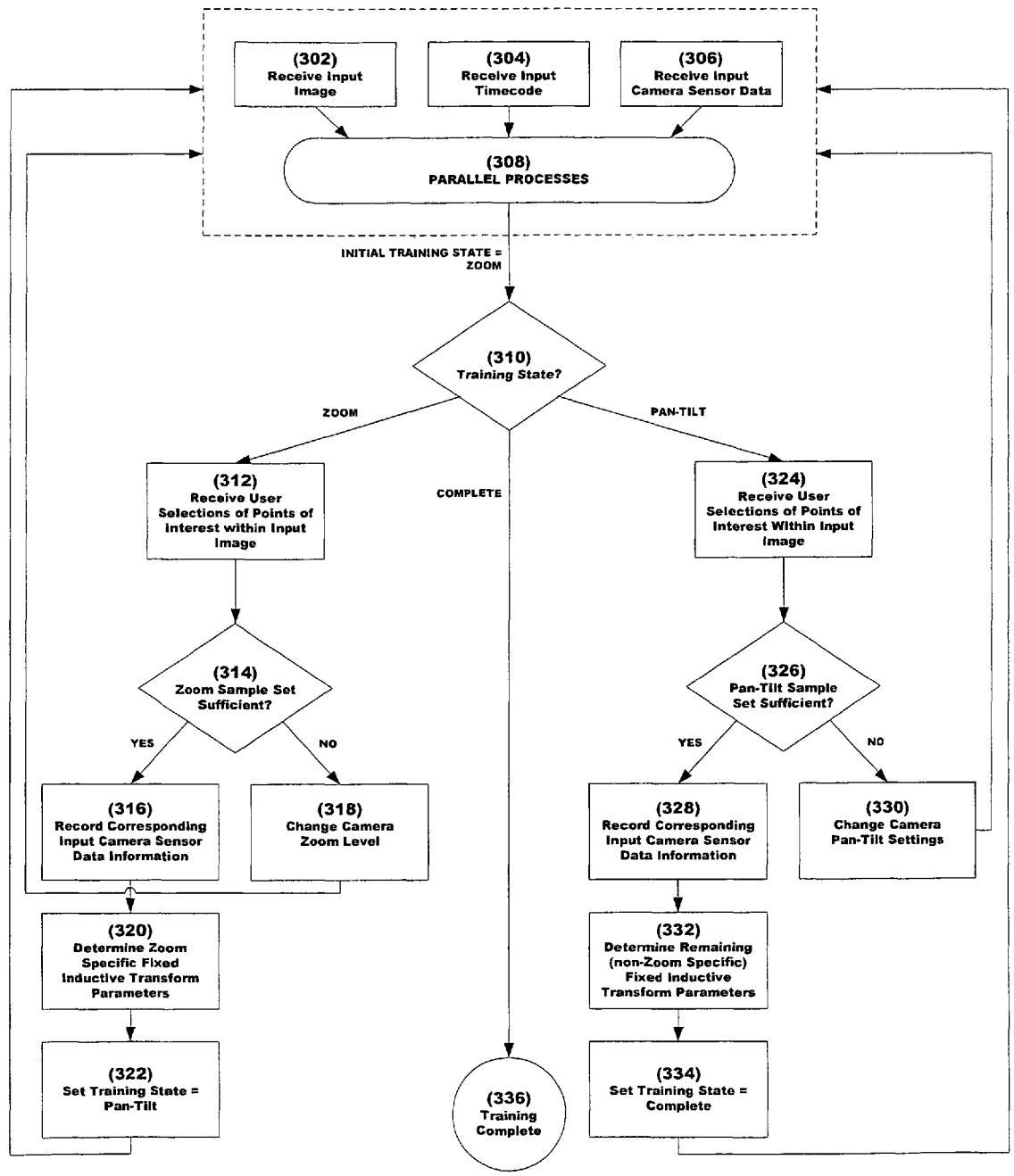
FIG. 3 is a process flow chart which illustrates a preferred method for finding the fixed inductive transform parameters.

FIG. 3 illustrates the process of deriving the set of fixed inductive transform parameters. A stream of input images 302, input timecodes 304, and input camera sensor data 306 are received, in parallel, by the AR system. Each stream is synchronized, such that a corresponding (a) input image, (b) input timecode and (c) input camera sensor data packet are selected for usage at every discrete point in time (approximately 30 times per second, within an embodiment where image processing is used, or approximately 60 times per second, within an embodiment where video field processing is used). The input camera sensor data packet that is selected from the input camera sensor data 306 contains pan, tilt, zoom and focus information for the input camera. Creating a correspondence between input images and input camera sensor data is achieved either through physically combining the two streams (for example, encoding the input camera sensor data within the input image itself), or via a fixed delay mechanism which is based on knowledge of the real-time behavior of both streams.

The training process begins with zoom training. During the zoom training phase, the goal is to characterize the inductive parameters of the view modeler which are affected by changes in the zoom and focus settings of the camera. For the purposes of the present invention, focus represents a zoom adjustment; thus, for the purposes of this discussion, we will treat zoom and focus synonymously. Within a preferred embodiment, the user will capture (using a suitable computerized digital capture means) a set of input images at various levels of zoom 318, across the entire extent of possible zoom levels supported by the input camera. Two primary operations take place using the captured images—a selection operation and a synchronization operation.

The first part of the selection operation will include choosing points of interest across a set of captured images, such that, across this set of captured images, the chosen points of interest correspond to the same locations within real world space. The second part of the selection operation will include choosing a set of points of interest within a single captured image. Essentially, the view modeler training function will use this point based information to determine how corresponding points change between different camera views.

Within the synchronization operation, the goal is to find a camera sensor data packet that corresponds to the captured input image. Pan, tilt, zoom and focus data from this packet is extracted and recorded 316 accordingly. The decision 314 regarding the sufficiency of the captured frame set is quite subjective, but typically 20–30 images captured across the entire zoom extent will suffice.

After each of the captured images has been processed by the user, information and preferably all information, with respect to points of interest and corresponding camera sensor data is fed to the view modeler in order to determine 320 the following zoom specific fixed inductive transform parameters: (a) radial distortion function, (b) effective focal length function, and (c) image zoom/distortion center function. We will now consider the characteristics of each of these parameters. Within a preferred embodiment, the radial distortion function mathematically models how a point is distorted based on its distance from the determined center of the image. The effective focal length function mathematically models how much a point scales out from the center of the image based on the distance of the eye from the virtual image plane. Finally, the image zoom/distortion center function mathematically models the center of the camera image from which zoom and radial distortion originate. Within a preferred embodiment, this set of three parameters will each be found by fitting a polynomial function based on the set of captured data. The determination of the focal length and image zoom/distortion center functions is loosely based on techniques described in Wilson's Ph.D. Dissertation, "Modeling and Calibration of Automated Zoom Lenses."

After the zoom based portion of the training is complete, pan-tilt based training is done. During the pan-tilt calibration phase, the goal is to characterize the fixed inductive parameters of the view modeler which are affected by changes in the pan and tilt settings of the camera. Within a preferred embodiment, the user will capture (using a suitable computerized digital capture means) a set of input images at various levels of pan and tilt 330. For each captured image, two primary operations take place. First, the user selects 324 a set of "points of interest" within the captured image. A set of points of interest will be selected across all captured images during this phase, such that within each captured image the selected points of interest correspond to the same locations within real world space. The second primary operation that takes place is to find a camera sensor data packet that corresponds to the captured input image. Pan, tilt, zoom and focus data from this packet is extracted and recorded 328 accordingly. The decision 326 regarding the sufficiency of the captured frame set is quite subjective, but typically 5–10 total images captured across the a range of pan and tilt will suffice.

After each of the captured images has been processed by the user, all information with respect to points of interest and camera sensor data is fed to the view modeler in order to determine 332 the remaining (non-zoom specific) fixed inductive transform parameters: (a) pixel aspect ratio, (b) rotation per pan encoder unit, (c) rotation per tilt encoder unit, (d) tilt perpendicular encoder setting, (e) horizontal shearing factor, (f) vertical shearing factor and (g) reference focal length. We will now consider the characteristics of each of these parameters. The pixel aspect ratio is determined by the video format, for example, the NTSC standard (CCIR 601) yields a pixel aspect ratio of 1:1.1. The rotation per pan encoder unit represents the conversion factor when converting from camera sensor pan units (which are manufacturer specific) to standard rotational units (radians). The rotation per tilt encoder unit represents the conversion factor when converting from camera sensor tilt units (which are manufacturer specific) to standard rotational units (radians). The tilt perpendicular encoder setting is expressed in manufacturer specific tilt units, and is used as a reference point for tilt data by the view modeler. The horizontal and vertical shearing factor parameters are factors used by the inductive transform for image warping purposes (see "Detailed Description" section 2C for more details below). The reference focal length is the focal length of the images used during pan-tilt training. Within a preferred embodiment, this set of parameters will be found using non-linear optimization based on the set of captured data.

1D. Selecting the Baseline Image (View)

The next setup step is to select the baseline image. Within a preferred embodiment of the invention, there are two guidelines for selection of the baseline image: (1) the baseline image must contain all vertices of the selected SCM, and (2) the baseline image should (for best performance) have corresponding pan, tilt, zoom and focus settings that are typical of images that will be processed during production of the event. For example, if the input camera is not typically zoomed during production, then the baseline view would have little or no zoom setting. Furthermore, one possible embodiment could involve several baseline views (one for each scene component model), in the case where the placement of every scene component model cannot be sufficiently captured within the same baseline image.

1E. Defining the Scene Component Model Set

With a preferred embodiment, the scene component model set contains three dimensional models for all real world objects that are considered "relevant" to the placement of AR inserts within the scene. A real world object O is considered relevant to the placement of AR inserts within the scene if one of the following is true: (a) it is anticipated that an AR insert will be placed on top of (and thus must be shaped to) the surface of O (a placement object), or (b) it is anticipated that an AR insert will be placed on top of a separate object which is moving within the space of O (a containing object). Each such relevant object will be defined to be a scene component, and a scene component model (SCM) will subsequently be created that corresponds to that scene component. The entire group of these created SCM's will comprise the scene component model set.

All SCM's are represented as polygonal meshes. These meshes are defined within a normalized model scale which does not necessarily correspond to real world scale. Usage of this normalized model scale is essential to the success of the view modeler within the present invention. This is because the view modeler is not aware of, and does not process any real world space dimensions or measurements (refer to the discussion of real world independence within the "Background" section above). Note that a consistent model scale must be used across the entire scene component model set in order to allow one SCM to correctly move and be placed within the space of another SCM. Furthermore, within a preferred embodiment, the geometry of each SCM would match the same characteristics of the corresponding real world object as closely as possible.

Figure 4:
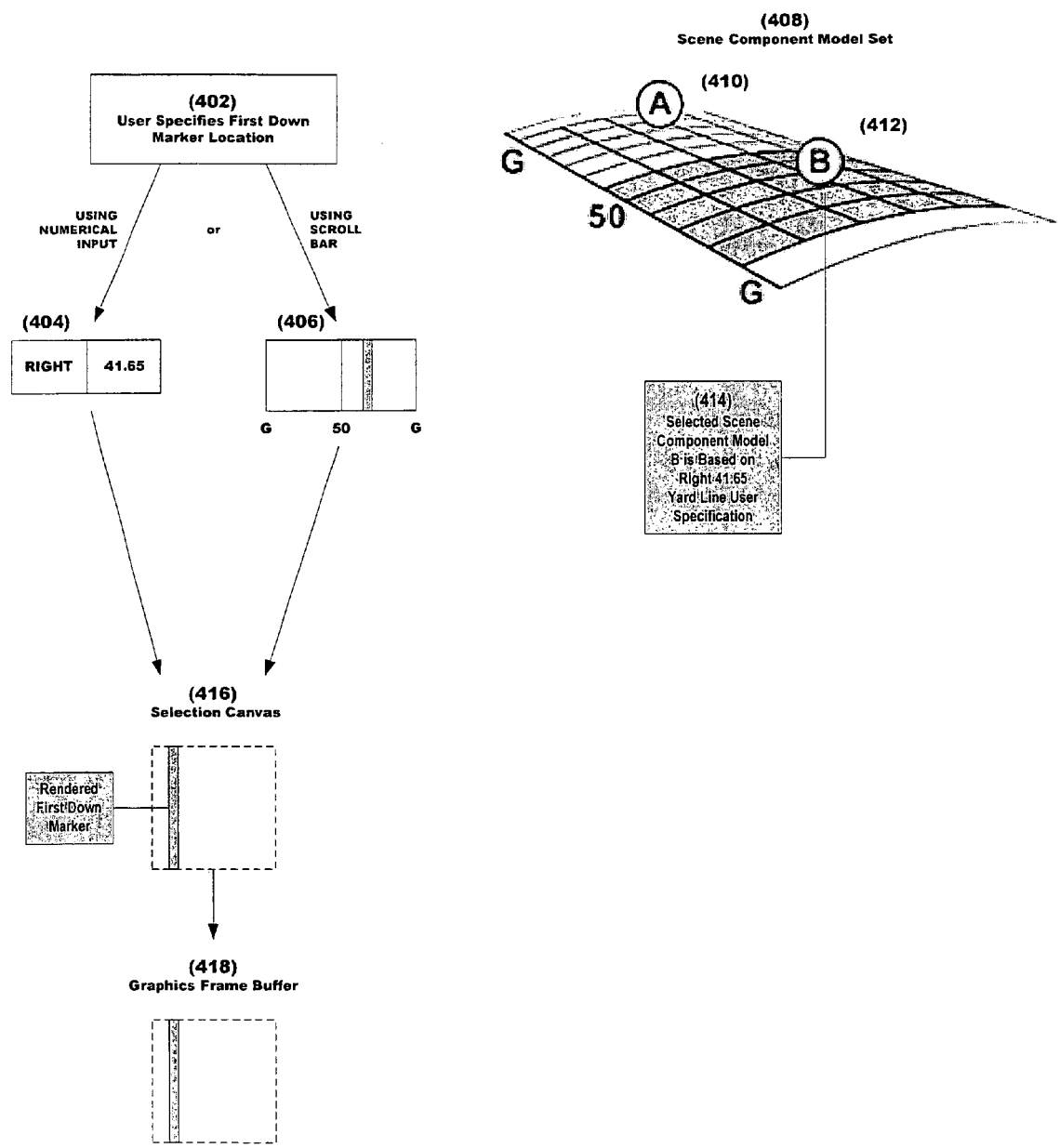
FIG. 4 is a process and content flow chart which illustrates a preferred embodiment of the graphics frame buffer filling step and the SCM selection step, for use when the present invention is implemented for the purpose of supplying a virtual first down marker for a football game.

As an example of an SCM set, consider a portion of an embodiment of the present invention, implemented for the purpose of providing a virtual first down marker for a football television broadcast. Refer to FIG. 4 for an illustration of this embodiment. The three-dimensional (3D) SCM set 408 consists of two models A 410 and B 412; model A 410 representing the left half of the football field, and model B 412 representing the right half of the football field. Both model A 410 and B 412 are "crowned" across the span from near sideline to far sideline (within model space) in proportion to the expected crown of the actual physical field. In effect, we have two SCM's which have the same shape and aspect ratio as the two halves of the football field. In order to place a virtual first down marker on the field using this SCM set, three steps are taken. First, the appropriate model A 410 or model B 412 is chosen 414, based on which side of the field the first down marker yard line is located. Second, a rectangle is rendered into a two-dimensional (2D) selection canvas (buffer) 416 at a location proportional to the physical location of the yard marker relative to the 2D field space encompassed by the selected SCM 414. Third, the contents of the 2D selection canvas are copied to the 2D graphics frame buffer 418. Finally, the graphics frame buffer is textured onto the selected SCM 414.

Figure 6:
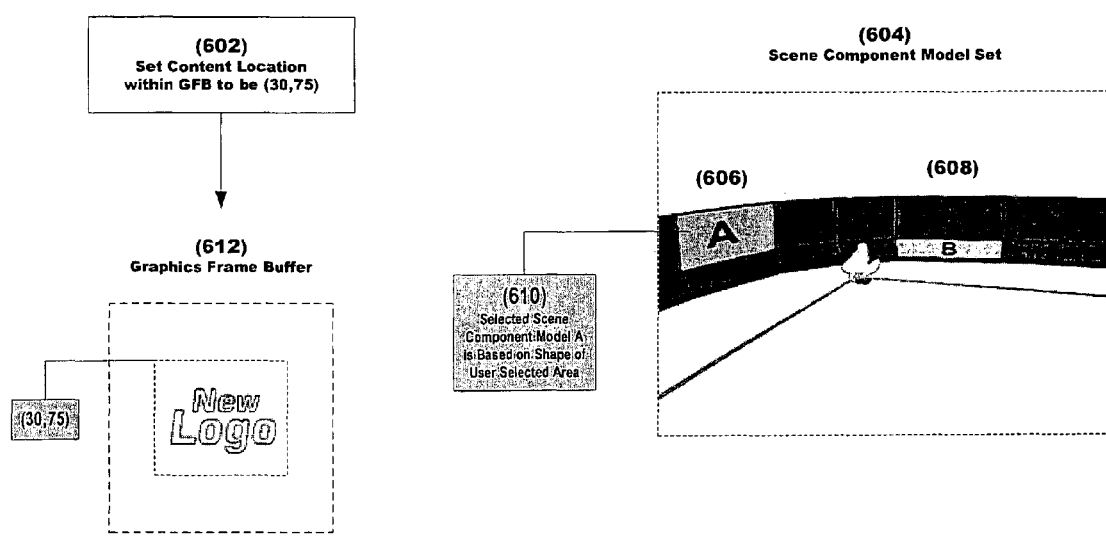
FIG. 6 is a process and content flow chart which illustrates a preferred embodiment of the graphics frame buffer filling step and the SCM selection step, for use when the present invention is implemented for the purpose of supplying a virtual advertising billboard.
Figure 7:
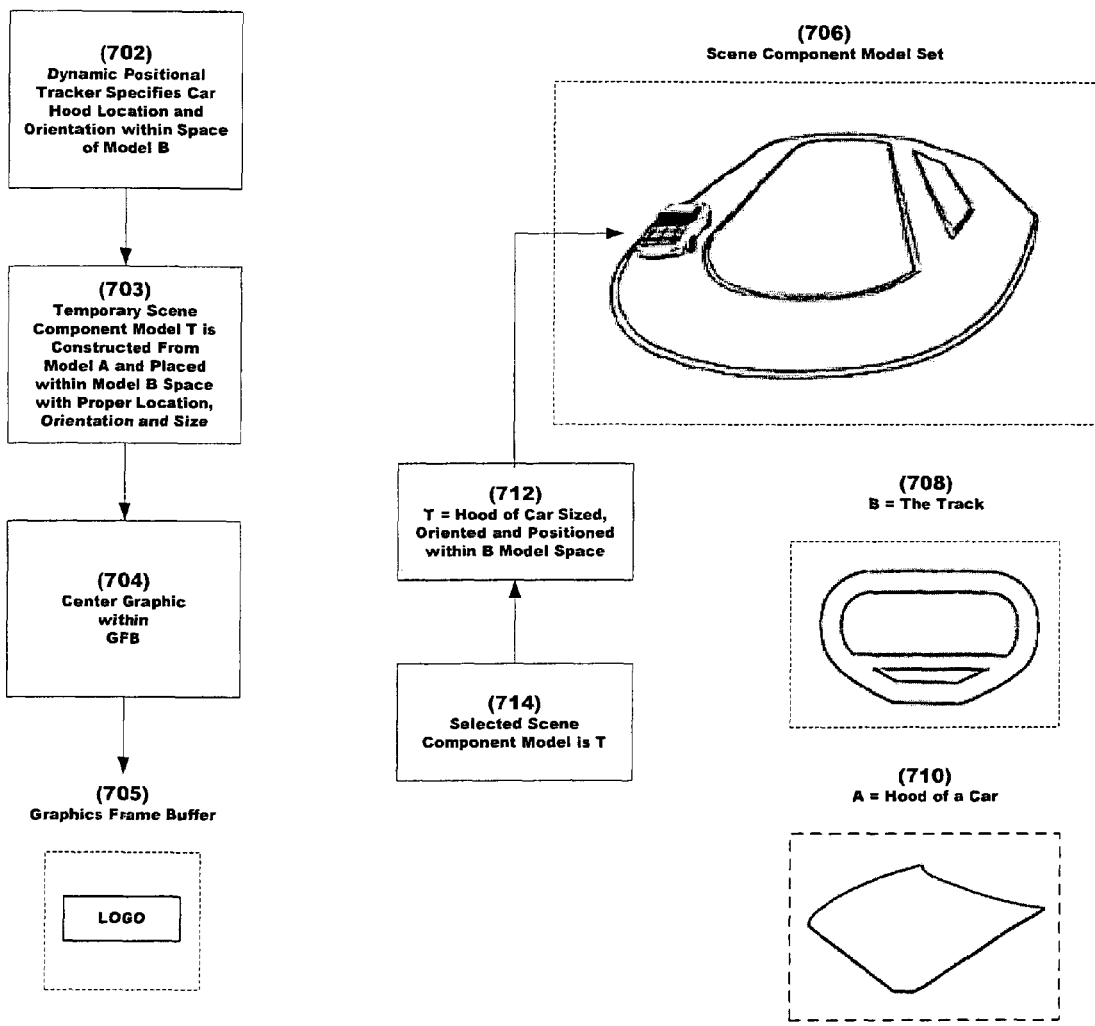
FIG. 7 is a process and content flow chart which illustrates a preferred embodiment of the graphics frame buffer filling step and the SCM selection step, for use when the present invention is implemented for the purpose of displaying a graphic on top of a moving object.
Figure 10:
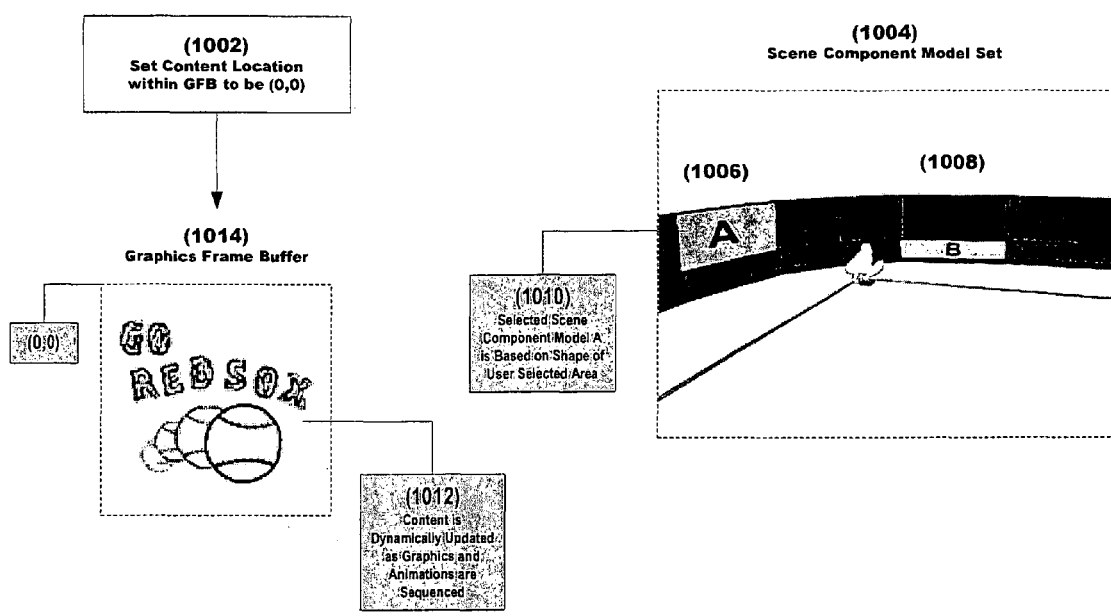
FIG. 10 is a process and content flow chart which illustrates a preferred embodiment of the graphics frame buffer filling step and the SCM selection step, for use when the present invention is implemented for the purpose of displaying dynamically changing content.

Other examples of SCM sets are shown in FIGS. 6, 7 and 10. FIG. 6 illustrates a portion of an embodiment of the present invention, implemented for the purpose of providing a virtual advertising billboard. FIG. 7 illustrates a portion of an embodiment of the present invention, implemented for the purpose of displaying a graphic on top of a moving object. FIG. 10 illustrates a portion of an embodiment of the present invention, for the purpose of providing dynamic animated content.

1F. Defining the Set of SCM Insert Regions within the Baseline Image

Within a preferred embodiment, the SCM insert region for each SCM is defined by the user via direct selection onto the baseline image. The selection may be done by mouse click, text input, cursor movement, light pen, touch screen or any other input mechanism. Essentially, the region which will contain the SCM is defined within the 2D space of the baseline image. In the case of an SCM which is represented by a 2D quadrilateral, the user interface is very straightforward. The user selects four points within the baseline image which correspond to the placement of each of the four vertices of the SCM. In the case of an SCM represented by a general 3D polygonal mesh, the preferred embodiment would provide a graphical user interface which allows the user to match the SCM polygonal mesh to the baseline view. Digital rotation, scaling, translation and perspective software tools allow the user to visually "mold" the SCM into the baseline view.

1G. Determining the Set of SCM Baseline Perspective Transforms

Recall that the baseline view is the view from which all input view transformations will take place during live and post production, as follows:

1. Transform the vertices of the selected SCM (3D space) into the appropriate points (2D space) within the baseline view, using a "baseline perspective transform", thus creating the baseline embedded model;
2. Transform the vertices of the baseline embedded model (2D space) into the input view (2D space), using a herein defined inductive transform, thus creating the input embedded model;
3. Texture the GFB onto the input embedded model (2D space);

Thus, within a preferred embodiment of the present invention, each SCM will have its own baseline perspective transform, which maps each vertex point within the SCM to corresponding points within the baseline view (step 1).

There are several possible means for determining each SCM baseline perspective transform. We will consider two possible means here. First, consider the case of an embodiment of the present invention which allows only 2D quadrilateral SCM's. Any baseline embedded model that corresponds to a 2D quadrilateral SCM can be represented by a 2D quadrilateral. Thus, transforming a 2D quadrilateral SCM to the baseline view is reduced to the problem of finding a mapping from the 2D quadrilateral SCM to the 2D quadrilateral baseline embedded model. Such a mapping is defined by Heckbert in his Master's thesis "Fundamentals of Texture Mapping and Image Warping". Heckbert defines a set of equations that maps any 2D quadrilateral to any other 2D quadrilateral by using a 2D projective mapping; i.e., a 3×3 matrix. In order to compute this mapping, we solve the following set of equations, taken directly from Heckbert's paper:

$$\begin{bmatrix} u0 & v0 & 1 & 0 & 0 & 0 & -u0*x0 & -v0*x0 \\ u1 & v1 & 1 & 0 & 0 & 0 & -u1*x1 & -v1*x1 \\ u2 & v2 & 1 & 0 & 0 & 0 & -u2*x2 & -v2*x2 \\ u3 & v3 & 1 & 0 & 0 & 0 & -u3*x3 & -v3*x3 \\ 0 & 0 & 0 & u0 & v0 & 1 & -u0*y0 & -v0*y0 \\ 0 & 0 & 0 & u1 & v1 & 1 & -u1*y1 & -v1*y1 \\ 0 & 0 & 0 & u2 & v2 & 1 & -u2*y2 & -v2*y2 \\ 0 & 0 & 0 & u3 & v3 & 1 & -u3*y3 & -v3*y3 \end{bmatrix} \begin{bmatrix} a \\ b \\ c \\ d \\ e \\ f \\ g \\ f \end{bmatrix} = \begin{bmatrix} x0 \\ x1 \\ x2 \\ x3 \\ y0 \\ y1 \\ y2 \\ y3 \end{bmatrix}$$

where [ui, vi] are the coordinates of the 2D quadrilateral SCM, and [xi, yi] are the coordinates of the 2D quadrilateral baseline embedded model.

This mapping is our baseline perspective transform. We apply that baseline perspective transform in real-time by transforming homogeneous vectors representing all points within the SCM by the 3×3 matrix, then dividing through by the homogenous coordinate to get the resulting 2D position within the baseline image space, as follows:

$$\begin{bmatrix} xi' \\ yi' \\ w \end{bmatrix} = \begin{bmatrix} a & b & c \\ d & e & f \\ g & h & 1 \end{bmatrix} \begin{bmatrix} ui \\ vi \\ 1 \end{bmatrix} \text{ and } \begin{bmatrix} xi \\ yi \end{bmatrix} = \begin{bmatrix} xi'/w \\ yi'/w \end{bmatrix}$$

Now, consider the case of a preferred embodiment supporting 3D SCM's. Usage of the Heckbert projective mapping may be extended. In the case of an SCM represented by a 3D polygonal mesh of quadrilaterals, the baseline perspective transform consists of a set of Heckbert projective mappings, where one mapping exists for each quadrilateral contained within the mesh. Within an embodiment where the SCM is a 3D polygonal mesh comprised of polygons which are not necessarily quadrilaterals, each polygon may be decomposed into a set of quadrilaterals. For each of these resulting quadrilaterals, a baseline perspective transformation may be computed.

2. Production

Within the production phase, the constructs derived during the setup phase are now used to properly embed an AR insert into an input image sequence. Note that "production" may refer to either a live television broadcast, a post production television setting, or a studio. Furthermore, hybrid live and post-production usage is also possible. For example, AR insert usage within a video replay during a live television broadcast may be accomplished by an embodiment of the present invention. These post production and replay capabilities are accomplished by using television timecode for synchronization between archived camera sensor data and playback video generated by a digital video recorder. Note that the mechanics of the method for embedding AR inserts are independent of the source of the camera sensor data and the input image sequence. However, we will describe possible embodiments of the present invention within both post and live production settings later in this section.

Figure 5:
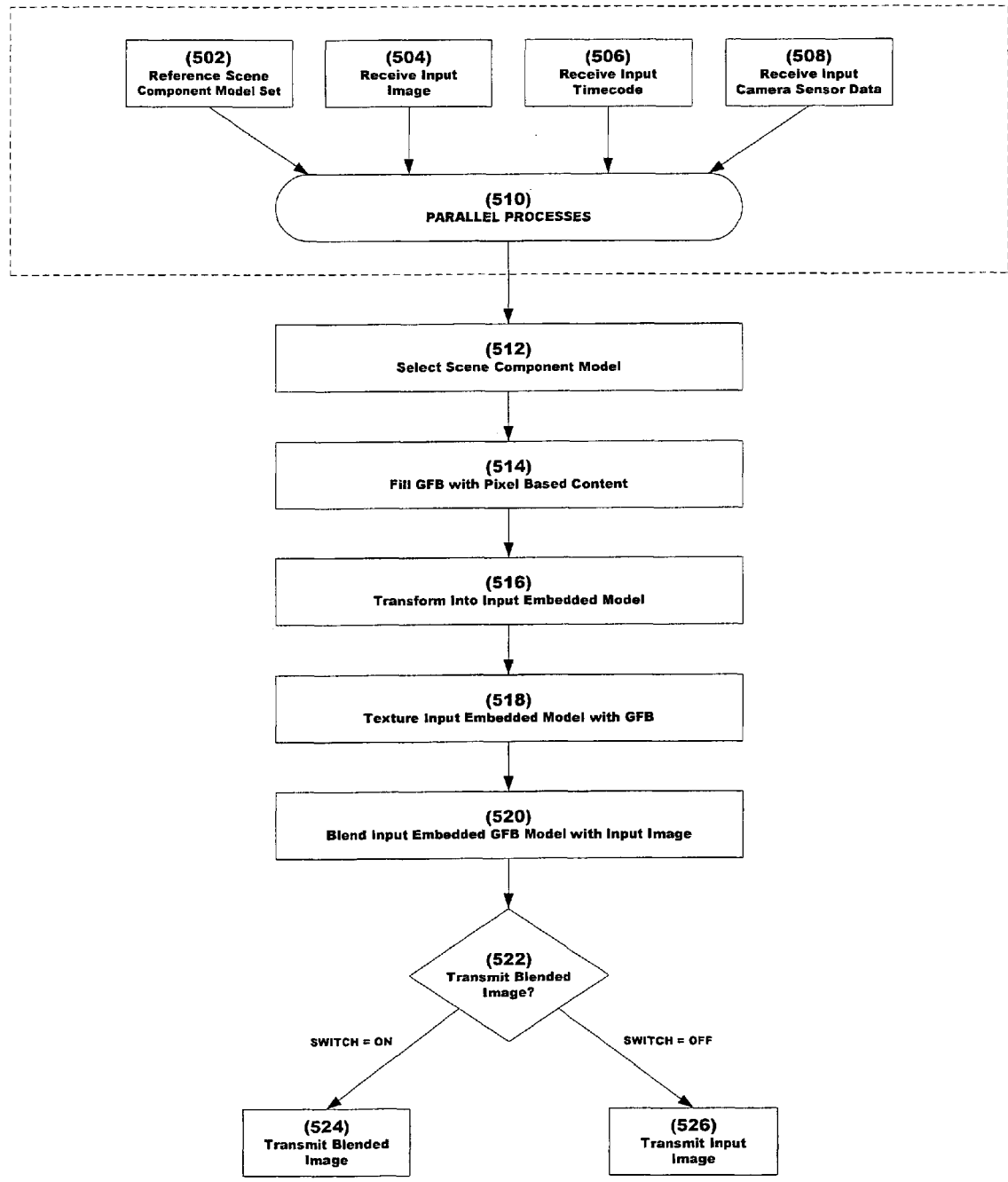
FIG. 5 is a process flow chart which illustrates a preferred method for embedding the contents of a dynamically updated graphics frame buffer into a timecode synchronous image sequence, in real-time.

The AR insert is built using a graphics frame buffer (GFB) textured onto a selected scene component model (SCM). The embedding of this GFB into an individual input image within the input image sequence, is accomplished via a six step method (refer to FIG. 5):

A. Select one SCM from the pre-determined SCM set; (512)
B. Fill the GFB with pixel data; (514)
C. Transform the selected SCM into the proper location, orientation and size relative to the input view, thus creating the input embedded model; (516)
D. Texture the input embedded model with the GFB, thus creating the input embedded GFB model; (518)
E. Combine the input embedded GFB model with the input image, thus creating the blended image; (520)
F. Transmit either the input image or the blended image, according to the pre-determined selection of a user; (522, 524, 526)

These steps are executed without knowledge, consideration or computation of any three dimensional locations or dimensions in real world space, and without using image recognition of any kind. This section will describe each of these steps in detail.

2A. Selecting the SCM

The present invention is intended to provide a mechanism for AR inserts, including those which consist of dynamic graphic content. This dynamic graphic content may be generated by any traditional GFB based rendering device and/or software. Pixel data is deposited into the GFB, and this GFB is essentially wrapped onto a SCM for the purpose of structurally matching the GFB with the scene. The wrapped (textured) SCM is properly positioned, oriented and sized before being drawn into the input view.

Recall that a scene component model set (SCM set) is created, during the setup phase, according to the specification outlined in "Detailed Description" section 1E. During the production phase of operation, the method of the present invention involves selecting one of the SCM's within the SCM set for usage. This selection is completely application and domain specific. In order to now illustrate this selection step, we will refer to multiple examples of preferred embodiments of the present invention.

We may refer to FIG. 4 in order to illustrate the concept of selecting the appropriate SCM from the SCM set. Generation of a virtual first down marker line, for a football broadcast, is done using a portion of an embodiment of the present invention. The user specifies the location of the first down marker using either numerical input 404 or a scroll bar 406. The SCM set 408 consists of SCM A 410 and SCM B 412. SCM A 410 represents the portion of the field to the left of midfield and inclusive of the midfield yard line, while SCM B 412 represents the portion of the field to the right of midfield. The SCM B 412 is selected 414, based on the fact that the user specified marker location is on the side of the field represented by SCM B 412.

We may also refer to FIG. 6 in order to illustrate the concept of selecting and using the appropriate SCM from the SCM set. The application is the placement of a virtual advertisement onto the backstop behind home plate during a baseball game. The GFB 612 is filled with content according to a desired offset 602. SCM A 606 is the selected SCM 610 based on the fact that the user has selected to place the virtual advertisement within the area modeled by SCM A 606. The SCM set 604 consists of SCM A 606 and SCM B 608. SCM A 606 represents a model of the shape of the curved backstop surface within the highlighted area shown in FIG. 6. SCM B 608 represents a model of the shape of the curved backstop surface within the also highlighted area shown in FIG. 6. Note that if the two portions of the backstop modeled by SCM A 606 and SCM B 608 were the same shape, then only one SCM would be required within the SCM set 604. This is because the intent of the SCM is to provide geometric information for the inserted GFB, and preferably NOT to provide an exactly scaled three dimensional model of the scene. However, two distinct baseline perspective transforms (one for each SCM) for the two locations within the baseline view would still be required.

Note that it may be desired to model the virtual advertisement as a flat planar surface, even if the actual real world surface is curved. This is often done for television production in order to provide the truest and highest possible readability of the advertisement for the viewer. Rather than representing the advertisement as a curved surface (where logos and text within the advertisement may become distorted due to this curvature), a flat rendering may be substituted instead. In this case, the SCM set would include a 2D planar model which could be placed anywhere within the scene, including on top of curved surfaces, in order to obtain the desired clean, undistorted visual effect. In this case, readability outweighs reality. Generally, the present invention supports any type of modeling scheme that utilizes three dimensional polygonal mesh models.

Now, consider the embodiment of the present invention shown in FIG. 7. The position of each car is dynamically tracked during an automobile race, with the purpose of displaying virtual advertisements as AR inserts on top of the hood of one or more of these cars. The preferred SCM set 706 includes three models—(1) SCM A 710 represents the hood of any one of the cars (we are assuming that the hood of each car is shaped relatively the same, which would certainly be the case in a stock car race), (2) SCM B 708 represents the portion of the race track that is visible to the input camera, and (3) SCM T 712 represents a temporary SCM created for the purpose of representing SCM A 710 within the space of SCM B 708.

Consider the case of placement of a virtual advertisement onto the hood of one of these cars. The position and orientation of this selected car are found 702 within the normalized model space, using an appropriate locating means. The details of the locating means are beyond the scope of the present invention. The reported position and orientation are used to transform 703 the temporary SCM T 712 into the normalized model space of the track, which is represented by SCM B 708. The GFB 705 is filled with a centered logo 704 in order to provide the content to be inserted. Within this embodiment, the selected SCM 714 will be SCM T 712. The baseline perspective transform for SCM B 708 will be utilized to transform SCM T 712 into the space of the baseline view (see details of the baseline perspective transform in "Detailed Description" section 1G above).

2B. Filing the GFB with Pixel Data

A preferred embodiment of the GFB within the present invention is a two dimensional pixel data buffer which has a configurable width and height. The width and height are set either (a) according to the needs of the domain or application, or (b) the constraints of the device or software which is generating the pixel data for the GFB. For an example of (a), consider an application where it is known that the GFB will be inserted into a square area with a 1:1 ratio of width to height. In this case, in order to avoid unnecessary distortion of the aspect ratio of the GFB graphic content when displayed as an AR insert, a 1:1 ratio of the GFB would be preferable. For an example of (b), consider the case where a video graphics device is utilized. It may be the case that this rendering device naturally generates data for, and interfaces with, a standard NTSC frame size of 720×486. Thus, in this case, it may be preferable to allow a 720×486 GFB.

Within a preferred embodiment, the transfer of pixel data into the GFB may be accomplished via multiple different possible strategies. For example, in the case of graphic rendering software which runs on the same physical computer as the AR system, the GFB may be established within a shared memory block which is accessible by both the graphic rendering software and the AR system. The graphic rendering software will deposit blocks of pixel data into the GFB, while the AR system will extract and use that GFB pixel data. These two operations may essentially take place in parallel, both utilizing the shared memory mechanisms made available by the software operating system. Another possibility is that a separate graphic rendering device is utilized, and transfers from that graphic rendering device are made to the GFB using an image transfer. A preferred embodiment would involve a digital video transfer in order to prevent degradation in the quality of the graphic content.

We may refer to FIG. 4 in order to illustrate the concept of filling the GFB with pixel data. Generation of a virtual line, such as a first down or scrimmage yard line indicator line for a football broadcast, may be achieved using a preferred embodiment of the present invention. The user specifies the location of the first down marker using either numerical input 404 or a scroll bar 406. As described above in "Detailed Description" section 2A, the SCM B 412 is selected 414, based on the fact that the user specified marker location is on the side of the field represented by SCM B 412. A two dimensional intermediate buffer called the "selection canvas" 416 is used for the rendering of a rectangle which (a) is positioned within the selection canvas 416 proportional to the physical location of the location of the first down marker relative to the origin of the selected SCM 414, and (b) has a size that is indicative of the user desired thickness of the line. For example, if the selection canvas 416 were 150×160, and the yard line is the 40 yard line right of midfield, then the upper left origin of the rendered rectangle within selection canvas 416, using the selected SCM B 412, would be (29,0), assuming the upper left origin of the selection canvas is (0,0). The contents of this selection canvas 416 are then directly copied into the GFB 416.

We may also refer to FIG. 6 in order to illustrate the concept of filling the GFB with pixel data. The application is the placement of a virtual advertisement onto the backstop behind home plate during a baseball game. The GFB 608 is simply filled with the appropriate logo information for the virtual advertisement. FIGS. 7 and 10 also illustrate the concept of filling the GFB with pixel data. The filling step within each figure is actually quite trivial, and exactly analogous to the filling step shown within FIG. 6.

2C. Transforming the SCM into the Input View

Figure 8:
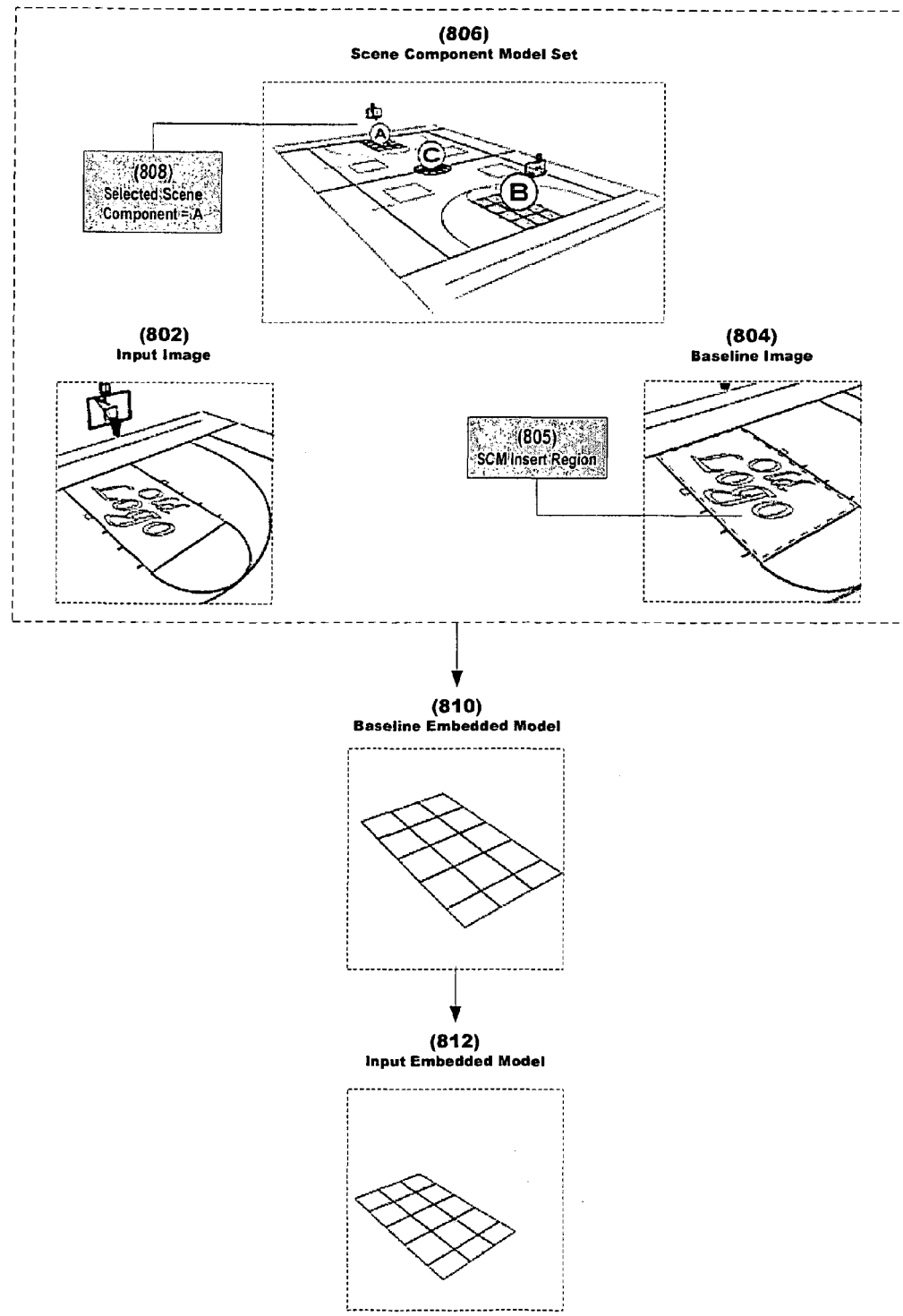
FIG. 8 is a process and content flow chart which illustrates a preferred embodiment of the transforming step utilized within the production phase of the present invention.

Once the SCM is selected and the GFB is filled, the next step is to actually transform the SCM into the input view; essentially finding a location, orientation and size that is appropriate for the SCM within the input view. Referring to FIG. 8 for illustration, this transformation is achieved via a two step process. First, the selected SCM 808 is transformed into the SCM insert region 805, which is defined within the view of the baseline image 804. This transformed SCM is called the "baseline embedded model" 810. Second, the baseline embedded model 810 is transformed into the correct location, orientation and size within the view of the input image 802. This transformed baseline embedded model is called the "input embedded model" 812. We will now clarify the preferred details of this process.

Within a preferred embodiment, the SCM insert region 805 is defined by the user via direct clicks on the baseline image. Recall that the baseline image was chosen during the setup phase (see "Detailed Description" section 1D above). The SCM insert region 805 essentially defines the AR insert location within the view of the baseline image 804. The SCM insert region is defined by the user before the event, and may be changed by the user, as necessary, throughout the event. The SCM insert region 805 may be defined using a multitude of different types of software tools. Various embodiments are possible. For example, in the case of an SCM which is represented by a 2D quadrilateral, the user interface is very straightforward. The user is allowed to select four points within the baseline image which correspond to the placement of each of the four vertices of the SCM. In the case of an SCM represented by a general 3D polygonal mesh, the preferred embodiment would provide a graphical user interface which allows the user to match the SCM polygonal mesh to the baseline view. Digital rotation, scaling, translation and perspective software tools allow the user to visually "mold" the SCM into the baseline view.

The transformation of the selected SCM 808 into the baseline view 804 is achieved through the baseline perspective transform. Recall that the baseline perspective transform is determined during the setup phase. Essentially, the baseline perspective transform computes a mapping from the normalized 3D space of the selected SCM 808 to the space of the baseline image 804. In the case of an SCM represented by a 3D polygonal mesh, in the case where all polygons are quadrilaterals, the baseline perspective transform consists of a set of Heckbert projective mappings, where one mapping exists for each quadrilateral contained within the mesh. Within an embodiment where the SCM is a 3D polygonal mesh, where each polygon is not necessarily a quadrilateral, a baseline perspective transformation could be constructed from a set of Heckbert projective mappings based on sub-quadrilaterals which result from decomposition of each of the non-quadrilateral polygons contained within the mesh. See "Detailed Description" section 1G above for more details regarding the derivation, form, and usage of the baseline perspective transform.

The step of transforming the baseline embedded model to the input embedded model is achieved through the use of a two dimensional "inductive transform". This inductive transform maps each vertex of the baseline embedded model 810 into the view space of the input image 802. The end result is the input embedded model 812. The inductive transform function is parameterized by a set of "fixed inductive transform parameters" and a set of "dynamic inductive transform parameters". The set of fixed inductive transform parameters is derived during the setup phase and will not change during the production phase (unless view modeler adjustments are unexpectedly needed during the production, potentially due to unexpected displacement of the camera). For each input image, a set of dynamic inductive transform parameter values is derived using the set of fixed inductive transform parameters and the pan, tilt, zoom and focus information corresponding to that input image.

For a complete discussion of the fixed inductive transform parameters, see "Detailed Description" section 1C above. We will list the preferred parameters here, again, for completeness of this section, along with the dynamic inductive transform parameters: Fired Inductive Transform Parameters:

a. radial distortion function
b. effective focal length function
c. image zoom/distortion center function
d. pixel aspect ratio
e. rotation per pan encoder unit
f. rotation per tilt encoder unit
g. tilt perpendicular encoder setting
h. horizontal shearing factor
i. vertical shearing factor
j. reference focal length Dynamic Inductive Transform Parameters
k. effective focal length
l. radial distortion
m. image zoom/distortion center Note that each of these dynamic parameter values is determined using the corresponding pre-determined fixed inductive parameter function. For example, within a preferred embodiment of the present invention, the effective focal length function computes the dynamic effective focal length value based on the camera sensor data associated with the input image. Similarly, the radial distortion function and image zoom/distortion center function compute the dynamic radial distortion value and the dynamic image zoom/distortion center value respectively, based on the camera sensor data associated with the input image.

Within a preferred embodiment of the present invention, the inductive transform warps points, between camera views, in a homogeneous coordinate space, using the rotation per pan encoder unit, rotation per tilt encoder unit, tilt perpendicular encoder setting, and reference focal length. Points in image space are transformed to and from the homogeneous coordinate space using the dynamic inductive transform parameters, pixel aspect ratio, horizontal shearing factor, and vertical shearing factor.

2D. Texturing the GFB onto the Input Embedded Model

Figure 9:
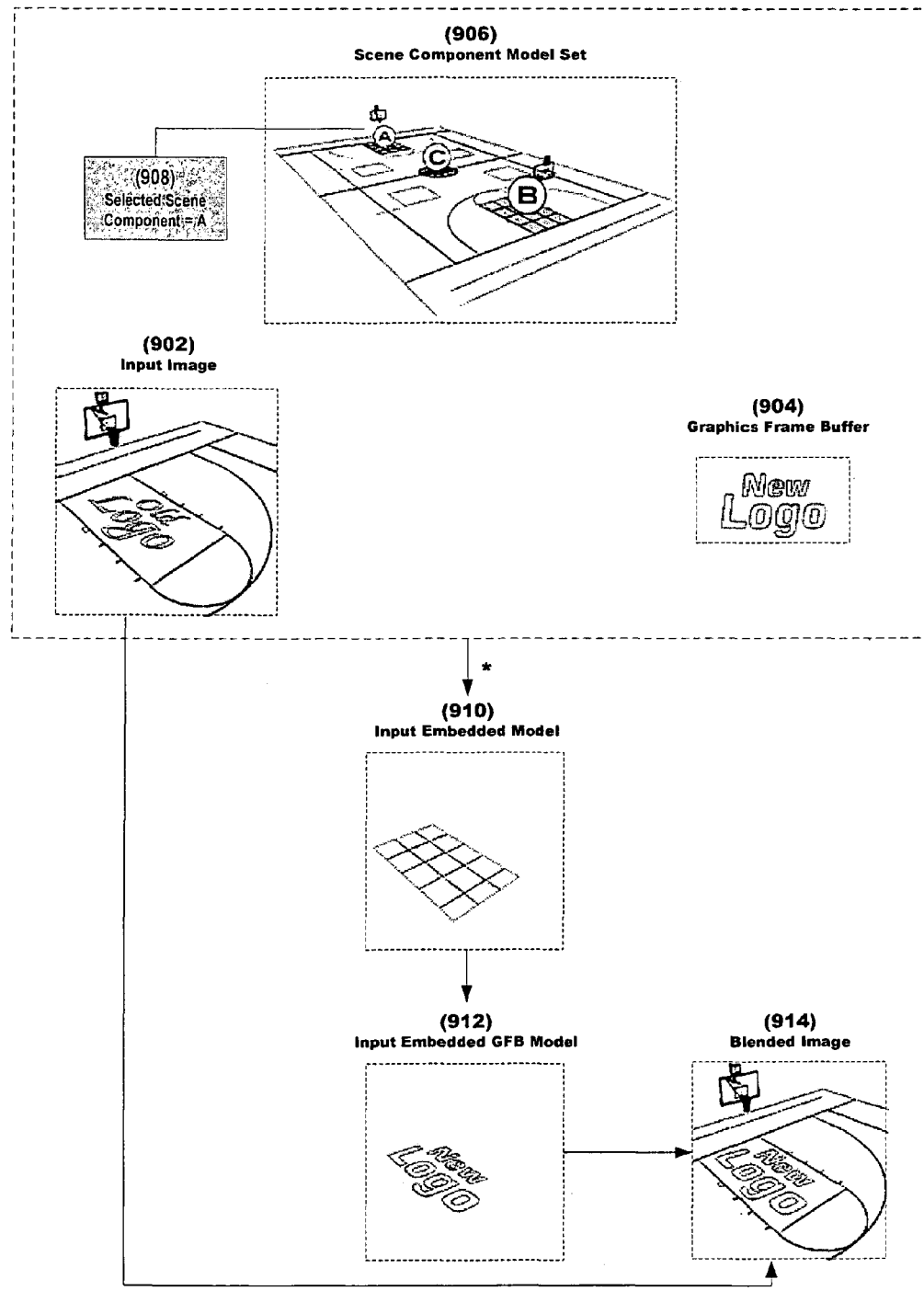
FIG. 9 is a process and content flow chart which illustrates a preferred embodiment of the blending step utilized within the production phase of the present invention.

Referring to FIG. 9, a selected SCM 908 has been chosen from the scene component model set 906. The GFB 904 is wrapped (textured) onto the input embedded model 910, yielding the input embedded GFB model 912.

2E. Blending the Input Embedded GFB Model with the Input Image

Again referring to FIG. 9, the input embedded GFB model 912 is now combined with the input image 902 in order to yield the blended image 914. The following sub-steps are taken in order to perform this blending step. From the input embedded GFB model, a set of bounding polygons, preferably rectangles, are found which define one or more "regions of interest". Within a preferred embodiment, the regions of interest are found by (a) determining minimum and maximum x and y for each of the quadrilaterals which define the input embedded GFB model, (b) deriving an axis-aligned 2D bounding box for each of these quadrilaterals, and (c) merging any 2D bounding boxes where the merged box would process fewer pixels than the originally separate boxes.

Pre-processing is then applied to the input image 902, on all pixels within the regions of interest. This pre-processing includes one or more of a set of pre-determined filters. Within a preferred embodiment, this may involve the usage of Gaussian, median, averaging, interlaced averaging, or other filters. Next, color separation is performed for all pixels within the regions of interest in the input image 902, using the color separator which was trained during the setup phase (see "Detailed Description" section 1B). Pixels which are determined to be foreground are given an alpha (transparency) value appropriate to foreground. Pixels which are determined to be background are given an alpha value appropriate to background. This color separation step essentially creates a set of "alpha rectangles". These alpha rectangles are copied into a previously empty image in order to create the "color separated alpha frame". Note that shapes other than rectangles are intended to be included within the scope of the invention, although rectangles are preferred.

The color separated alpha frame is then post-processed using one or more of a set of pre-determined filters. Within a preferred embodiment, this may involve the usage of an averaging filter, or any one of many other common smoothing filters. This post-processing step creates the "post-processed alpha frame". Finally, the input embedded GFB model 912 is alpha-blended with the input image 902 using a combination of the post-processed alpha frame and the input embedded GFB model 912 alpha channel for this alpha-blending. This is the blended image 914. Optionally, for this alpha-blending step, a two-dimensional alignment offset may be utilized in order to adjust for slight image shifts, such as those caused by vibrations. Also optionally, the alignment offset may be separate from the alpha-blending step. This alignment offset (x-off, y-off) represents a fine alignment tuning between the input embedded GFB model 912 and the input image 902. Within a preferred embodiment, this alignment offset may be determined dynamically during the production phase.

2F. Transmitting the Appropriate Image

The user will have access to a software switch which determines the output of the AR system. A setting of "on" for this switch will determine that the blended image will be transmitted as output. A setting of "off" for this switch will determine that the original input image will be transmitted as output. The AR insert may essentially be removed at any time.

2G. Production System Embodiments

Figure 11:
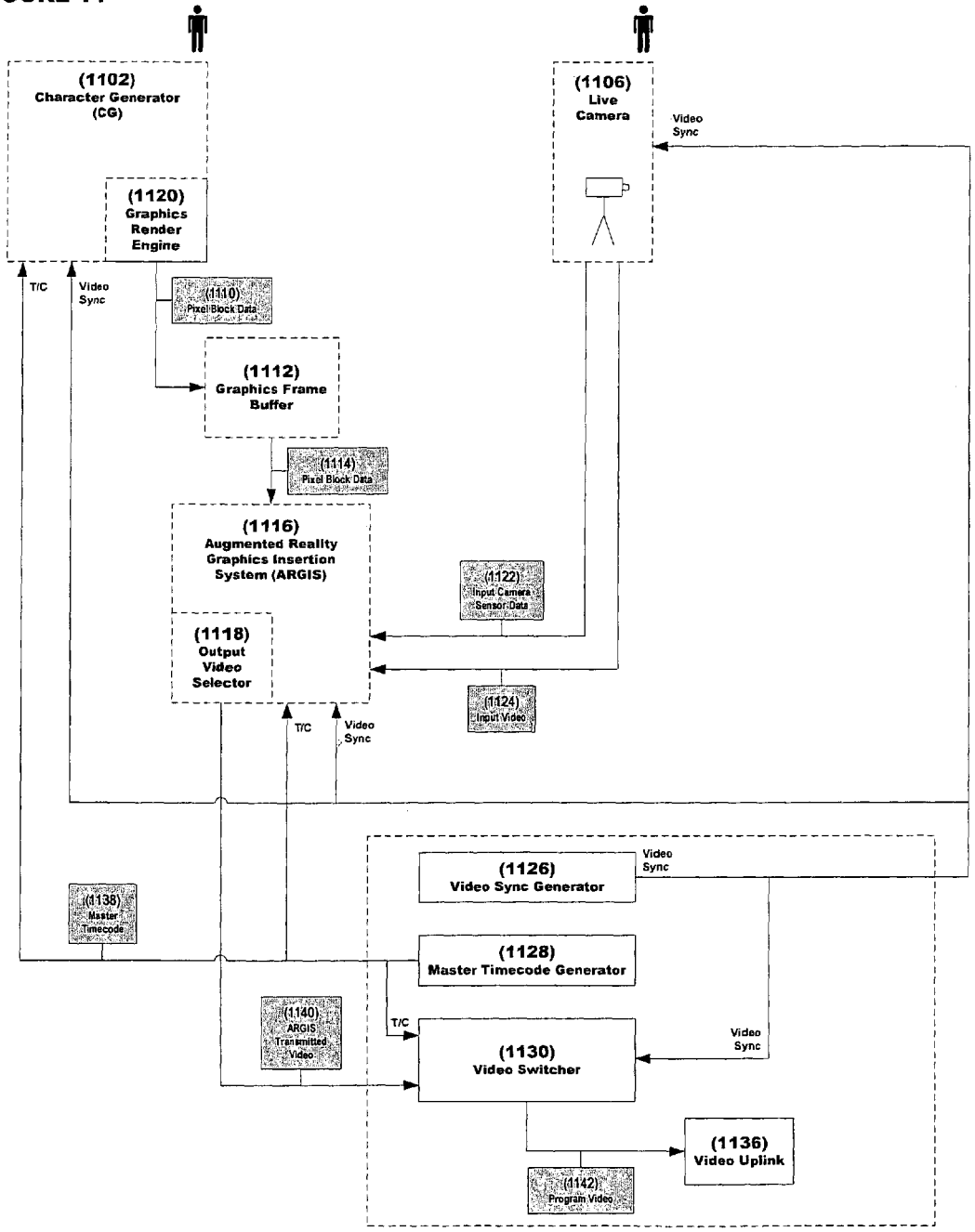
FIG. 11 is a schematic diagram which illustrates usage of one preferred embodiment of the invention, within a live television environment, where the input video source is a single broadcast camera.

FIG. 11 shows a high level schematic diagram illustrating how a preferred embodiment of the present invention seamlessly integrates into a subset of a common live television production environment. Within the embodiment pictured in FIG. 11, an industry standard character generator (CG) 1102 is used to generate real-time graphic content (pixel block data 1110), to be utilized for an AR insert. This real-time graphic content is created completely independently of the Augmented Reality Graphics Insertion System (ARGIS) 1116 that is used for embedding that content into the camera view. Essentially, the CG generates graphical content, and places that graphical content into a graphics frame buffer 1112 in exactly the same manner as it does when creating non-AR graphic content for the broadcast. Within a preferred embodiment, the CG 1102 may either be dedicated to creation of AR content only, or it may serve a dual purpose of creating both AR and non-AR content simultaneously, using mutually exclusive graphics frame buffers for each independent purpose. The graphic content created by the CG 1102 may consist of both static and dynamically animated graphic elements in both the AR and non-AR cases.

Figure 12:
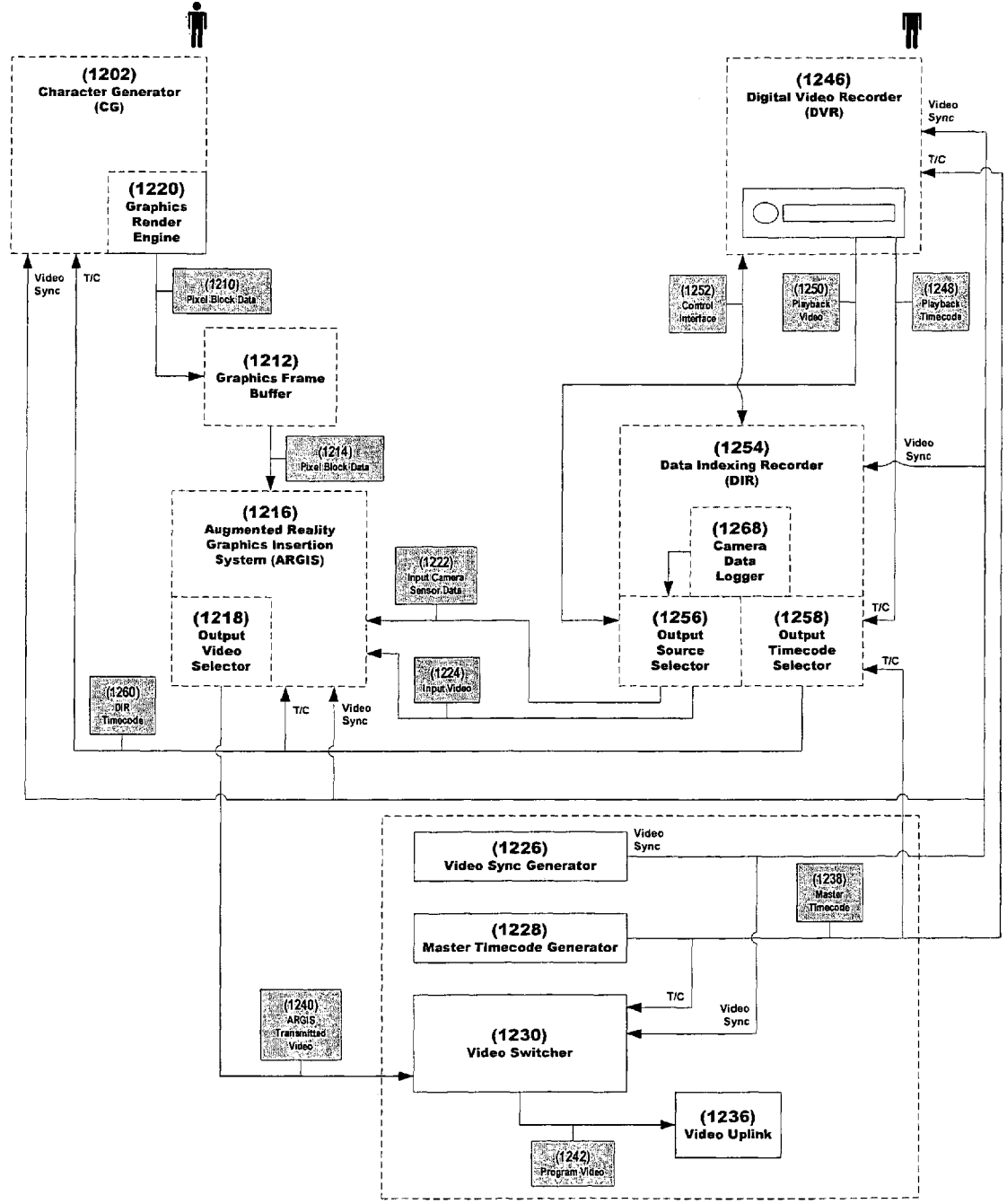
FIG. 12 is a schematic diagram which illustrates usage of one preferred embodiment of the invention, within a post-production television environment, where the input video source is a single digital video recorder.

FIG. 12 shows a high level schematic diagram illustrating how one preferred embodiment of the present invention seamlessly integrates into a subset of a common television post production environment. Within this environment, the input video 1224 is sourced from a digital video recorder (DVR) 1246, rather than directly from a live camera, as it was in FIG. 11. The DVR 1224 plays back an image sequence 1250 which was originally recorded from the video of an input camera during the live event. The data indexing recorder (DIR) 1254 plays back a stream of camera sensor data 1222 which was originally recorded from the sensors of the same input camera during the live event. The re-generated input camera sensor data 1222 and input video 1224 are synchronized using the playback timecode 1248 from the DVR 1246. The ARGIS module 1216 behaves exactly as it did within the live system shown in FIG. 11, where input camera video 1124 and input camera sensor data 1122 were received directly from a camera, rather than from a DVR. Essentially, any complications resulting from a different source of input video 1224 and input camera sensor data 1222 are "hidden" from ARGIS 1216 by the DIR 1254.

Figure 13:
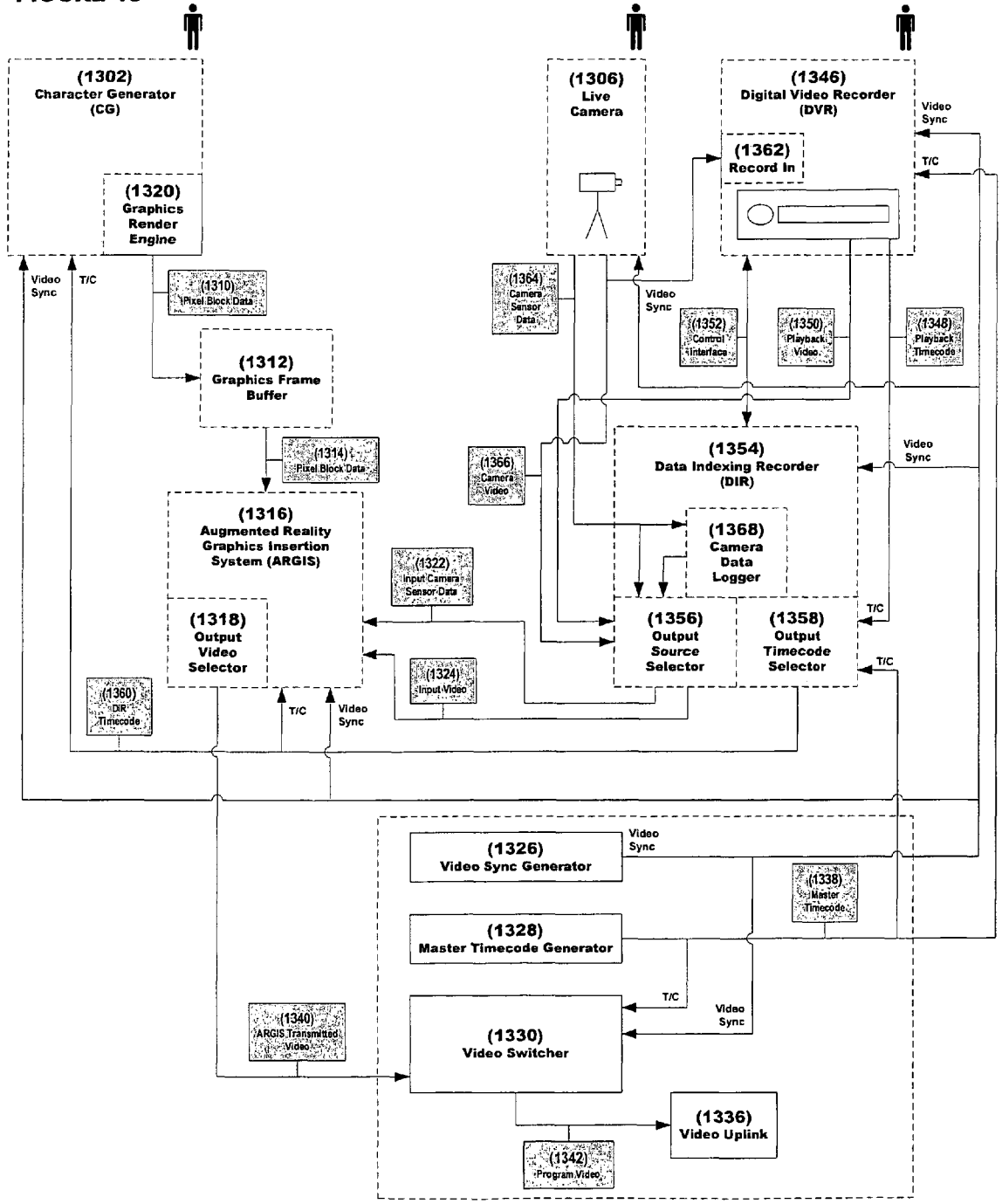
FIG. 13 is a schematic diagram which illustrates usage of one preferred embodiment of the invention, within a live, studio or post production television environment, where the input video sources are a single digital video recorder and a single broadcast camera.

FIG. 13 shows a high level schematic diagram illustrating how one preferred embodiment of the present invention seamlessly integrates into a subset of a common live television environment, where both live and replay modes are supported by the system. The DIR 1354 logs the live camera sensor data 1364 using the camera data logger 1368 in real-time. The video 1366 from the live camera 1306 is recorded by the DVR 1346 record module 1362 in real-time. Both the video 1366 and the camera sensor data 1364 streams from this live camera 1306 are saved with master timecode 1338 so that they can be played back and synchronized in either live replay mode or in post production. The DIR 1354 accepts video inputs from both the live camera 1306 and the DVR 1346 at all times. The DIR also has the ability to use camera sensor data 1364 from the live camera 1306 or camera sensor data from its own camera data logger 1368 hard media archive. Thus, at any time, the overall system can be put either into live (video and camera sensor data sourced from the live camera 1306), or replay (video from the DVR 1346 and camera sensor data from the camera data logger 1368) modes. Note that in live mode, the DIR 1354 uses master timecode 1338 for synchronization, while in replay mode the DIR 1354 uses playback timecode 1348 from the DVR.

The many features and advantages of the invention are apparent from the detailed specification. Thus, the invention is intended to include all such features and advantages of the invention which fall within the true spirits and scope of the invention. Further, since numerous modifications and variations will readily occur to those skilled in the art, it is not desired to limit the invention to the exact construction and operation illustrated and described in the specification, claims, and drawings herein. Accordingly, all appropriate modifications and equivalents may be included within the scope of the invention.

We claim:

1. A method of placing content into an image sequence, comprising:
    applying a transform function to visual content to be inserted into an image sequence; and
    blending the transformed visual content with the image sequence;
    wherein the applying step and the blending step together result in insertion of the content into the image sequence such that the content appears at a target location as if it had been part of the original scene displayed by the image sequence; and
    wherein the applying step comprises all applied geometric transformations of the visual content, is performed without reference to any content contained in the image sequence, is performed with reference to a view model that resulted beforehand from training that used camera sensor data, and is performed without reference to any three dimensional real world space locations or dimensions.

2. The method of claim 1 wherein the three dimensional real world space locations include a location of a camera which originally produced the image sequence.

3. The method of claim 1 wherein the three-dimensional real world space dimensions comprise units of physical measurement relating to the scene of the image sequence.

4. The method of claim 1 wherein the blending step is performed without reference to any three-dimensional real world space locations.

5. The method of claim 1, wherein the target location may change relative to the scene as the image sequence progresses.

6. The method of claim 1, wherein the image sequence is received from an analog video recorder, a digital video recorder or a broadcast quality video camera.

7. The method of claim 1:
    wherein a portion of the visual content is placed into an input image within the image sequence;
    comprising the additional steps of:
        referencing a dynamic scene component model set which contains a three dimensional model for each of a subset of objects present in the scene that is displayed by the image sequence;
        receiving camera sensor data corresponding to the input image;
        selecting one scene component model out of the scene component model set; and
        filling a graphics frame buffer (GFB) with updated pixel data; and
    wherein the transforming step comprises:
        transforming the selected scene component model such that, when inserted into the input image, the selected scene component model will appear as if it had been part of the original scene displayed by the input image, thus creating an input embedded model; and
        texturing the input embedded model with said GFB, thus creating an input embedded GFB model; and
    wherein the blending step comprises blending the input embedded GFB model with the input image such that the input embedded GFB model appears as if it had been part of the original scene displayed by the input image, thus creating a blended image; and
    wherein the method also comprises the step of transmitting the input image or the blended image according to a selection of a user.

8. The method of claim 7, wherein the sensor data relates to a camera that has collected the input image and includes:
    pan information;
    tilt information;
    zoom information; and
    focus information.

9. The method of claim 7, wherein each scene component model within the scene component model set comprises a two dimensional quadrilateral.

10. The method of claim 7, wherein:
    each scene component model within the scene component model set comprises a three dimensional mesh of polygons; and
    each polygon within the three dimensional mesh comprises a quadrilateral.

11. The method of claim 7, wherein:
    each model in the scene component model set is represented within a normalized scale of measurement;
    the scale is not required to use actual real world units of measurement;

the subset of objects includes all placement objects upon which the GFB may possibly be textured;

the subset of objects further includes all containing objects which enclose movement of any of the placement objects; and each model in the scene component model set comprises one or more polygonal meshes.

12. The method of claim 7, wherein the applying step further comprises:

identifying a pre-determined scene component model insert region corresponding to the target location, wherein the insert region has been pre-selected by a user;

identifying a baseline perspective transform for the selected scene component model;

transforming, using the baseline perspective transform, three dimensional coordinates in scene component model space to two dimensional coordinates within a view space of a baseline image;

mapping, using the baseline perspective transform, the selected scene component model into the scene component model insert region within the baseline image, thus creating a baseline embedded model;

deriving, based solely on the sensor data and a pre-determined inductive camera model, a set of parameters for a parameterized inductive transform;

converting, using the parameterized inductive transform, two dimensional coordinates in the view space of the baseline image to two dimensional coordinates within a view space of the input image; and transforming, using the parameterized inductive transform, the baseline embedded model such that the baseline embedded model is correct for the input image, thus creating an input embedded model.

13. The method of claim 12, wherein the scene component model insert region comprises one or more two dimensional quadrilaterals.

14. The method of claim 7, wherein the blending step comprises:

determining a set of bounding polygons which define one or more regions of interest in the input image;

performing pre-processing on pixels within the one or more regions of interest, wherein the pre-processing includes application of one or more of a set of pre-determined filters, thus creating a pre-processed input image;

performing color separation via reference to the pre-processed input image, according to a pre-determined color separation model, on the pixels within the one or more regions of interest, such that pixels that are determined to be background are given a background appropriate alpha value, while pixels that are determined to be foreground are given a foreground appropriate alpha value, thus creating a set of alpha polygons;

copying the set of alpha polygons into a previously empty image, thus creating a color separated alpha frame;

performing post-processing on the color separated alpha frame, on the pixels within the regions of interest, wherein the post-processing includes application of one or more of a set of pre-determined filters, thus creating a post-processed alpha frame; and alpha-blending the input embedded GFB model into the input image, using a combination of the post-processed alpha frame and an alpha channel of the input embedded GFB model for said blending, thus creating the blended image.

15. The method of claim 14 wherein the alpha-blending step uses a dynamically determined blending alignment offset for two dimensional refinement of an alignment of the input embedded GFB model and the pre-processed input image.

16. The method of claim 14, wherein the color separation model has been determined by a method comprising:

receiving a reference image sequence;

receiving selections from a user, via an input means, of one or more regions of interest in the image sequence;

determining, for the regions of interest, a set of color regions based on contained pixel colors;

refining, for the regions of interest, via manual user modifications, the color region, thus creating a set of refined color regions;

adding, for the regions of interest, each color within the set of refined color regions to a background inclusion table; and maintaining the background inclusion table in computer software memory such that colors are directly indexed;

wherein the background inclusion table comprises the set of colors which will be considered background within the color separation model.

17. The method of claim 7:

wherein the transmitting step comprises determining a position of an on/off switch;

wherein a switch position set to on indicates transmission of the blended image; and wherein a switch position set to off indicates transmission of the input image.

18. A method of placing a virtual marker line into an image sequence, comprising:

applying a transform function to a marker line that is to be inserted into an image sequence that was produced by a camera; and blending the transformed line with the image sequence;

wherein the applying step and the blending step together result in insertion of the line into the image sequence such that the line appears at a target location as if it had been part of the original scene displayed by the image sequence; and wherein the applying step comprises all applied geometric transformations of the line, is performed without reference to any real-time content contained in the image sequence, is performed with reference to a view model that was defined beforehand in a setup phase that included training using camera sensor data, and is performed without reference to any location of the camera.

19. The method of claim 18:

wherein an instance of the marker line is placed into an input image within the image sequence;

further comprising the steps of:

referencing a dynamic scene component model set which contains a three dimensional model for each of a subset of objects present in the physical scene that is displayed by the image sequence;

receiving camera sensor data corresponding to the input image;

selecting one scene component model out of said scene component model set; and filling a graphics frame buffer (GFB) with updated pixel data; and wherein the transforming step comprises:

transforming the selected scene component model such that, when inserted into the input image, the selected scene component model will appear as if it had been part of the original scene as displayed by the input image, thus creating an input embedded model; and texturing the input embedded model with said GFB, thus creating an input embedded GFB model; and wherein the blending step comprises blending the input embedded GFB model with the input image such that the input embedded GFB model appears as if it had been part of the original scene displayed by the input image, thus creating a blended image; and wherein the method also comprises the step of transmitting the input image or the blended image according to a selection of a user.

20. The method of claim 19, wherein the scene component model set includes:

a first model of a three dimensional surface representing a first section of a playing field that is substantially bounded by two sidelines, a first goal line or end point and a midpoint inclusive; and a second model of a three dimensional surface representing a second section of the playing field that is substantially bounded by the two sidelines, the midpoint and a second goal line or end point.

21. The method of claim 19:

wherein the selecting step comprises:

periodically receiving a user-selected value of a field location, wherein the value is not received via a direct input on an image taken from a live camera video stream; and choosing a scene component model from the first model and the second model such that field position corresponding to the user-selected value is physically contained by the physical space represented by the selected scene component model, thus yielding the selected scene component model; and wherein the filling step comprises:

mapping the user-selected value to a quadrilateral within a two-dimensional selection canvas, wherein the quadrilateral has a location within the selection canvas proportional to a physical location of a position on the playing field and a size that is indicative of a desired thickness of the virtual marker line, according to a user selection;

filling the quadrilateral with a desired pattern and color, according to a user selection; and copying contents of the selection canvas into the GFB.

22. A method of placing a virtual sign into an image sequence, comprising:

applying a transform function to a virtual sign that is to be placed into an image sequence that was produced by a camera; and blending the transformed sign with the image sequence;

wherein the applying step and the blending step together result in insertion of the sign into the image sequence such that the sign appears at a target location as if it had been part of the original scene displayed by the image sequence; and wherein the applying step comprises all applied geometric transformations of the sign, is performed without reference to any content contained in the image sequence, is performed with reference to a view model that was defined beforehand in a setup phase that included training using camera sensor data, and is performed without reference to location of the camera.

23. The method of claim 22:

wherein an instance of the sign is placed into an input image within the image sequence;

further comprising the steps of:

referencing a dynamic scene component model set which contains a three dimensional model for each of a subset of objects present in the physical scene that is displayed by the image sequence;

receiving camera sensor data corresponding to the input image;

selecting one scene component model out of the scene component model set; and filling a graphics frame buffer (GFB) with updated pixel data; and wherein the applying step comprises:

transforming the selected scene component model such that, when inserted into the input image, the selected scene component model will appear as if it had been part of the original scene as displayed by the input image, thus creating an input embedded model; and texturing the input embedded model with the GFB, thus creating an input embedded GFB model; and wherein the blending step comprises blending the input embedded GFB model with the input image such the said input embedded GFB model appears as if it had been part of the original scene displayed by the input image, thus creating a blended image; and wherein the method also comprises the step of transmitting the input image or the blended image according to a selection of a user.

24. The method of claim 23, wherein the scene component model set includes:

a first model of a three dimensional surface representing the shape of one area upon which the sign may be placed; and a second model of a three dimensional surface representing the shape of another area upon which the sign may be placed.

25. The method of claim 23:

wherein the selecting step comprises:

periodically receiving a user-selected location for the sign, wherein the location was selected via a direct input on an image captured from the image sequence;

choosing a scene component model from the first and second models depending on a physical shape of the location, thus yielding a selected scene component model; and wherein the filling step comprises copying the sign into the GFB.

26. A method of placing content on a moving object in an image sequence, comprising:

applying a transform function to visual content to be inserted into an image sequence, wherein the image sequence includes a moving object; and blending the transformed visual content with the image sequence;

wherein the applying step and the blending step together result in insertion of the content into the image sequence such that the content appears at a target location as if it had been part of the original scene displayed by the image sequence, and such that the content is located on the moving object as the object moves in the scene; and wherein the applying step comprises all applied geometric transformations of the visual content is performed without reference to any content contained in the image sequence, is performed with reference to a view model that was defined beforehand in a setup phase that included training using camera sensor data, and is performed without reference to any three dimensional real world space locations or dimensions.

27. The method of claim 26:
wherein a portion of the content is placed into an input image within the image sequence;
comprising the additional steps of:
referencing a dynamic scene component model set which contains a three dimensional model for each of a subset of objects present in the scene that is displayed by the image sequence;
receiving camera sensor data corresponding to the image;
selecting one scene component model out of the scene component model set; and
filling a graphics frame buffer (GFB) with updated pixel data; and
wherein the applying step comprises:
transforming the selected scene component model such that, when inserted into the input image, the selected scene component will appear as if the selected scene component model had been part of the original scene displayed by the input image, thus creating an input embedded model; and
texturing the input embedded model with said GFB, thus creating an input embedded GFB model; and
wherein the blending step comprises blending the input embedded GFB model with the input image such that the input embedded GFB model appears on the moving object as if the input embedded GFB model had been part of the original scene displayed by the input image, thus creating a blended image; and
wherein the method also comprises the step of transmitting either the input image or the blended image, according to a selection of a user.

28. The method of claim 27, wherein the scene component model set includes:
a first model of a three dimensional surface representing a first area, the first area being the part of the moving object upon which the content will be placed;
a second model of a three dimensional surface representing a second area, the second area being that within which the moving object will travel; and
a third model, comprising a temporary three dimensional surface that is constructed from the first model, then oriented and positioned in real-time based on a dynamic location of the moving object within the space of the second model.

29. The method of claim 28, wherein the selecting step comprises:
periodically specifying, using an object positional tracker, a dynamic location and orientation of the moving object, wherein the dynamic location and orientation are specified within the model without reference to any location of any camera that produced the image sequence;
constructing the third model from the first model;
positioning and orienting the third model within the second model according to the dynamic location and orientation of the object; and
selecting the third model, thus yielding the selected scene component model.

30. A method of inserting dynamically changing visual content into an image sequence, comprising:
applying a transform function to dynamically changing visual content; and
blending the transformed dynamically changing visual content with an image sequence;
wherein the applying step and the blending step together result in insertion of the content into the image sequence such that the dynamically changing visual content appears as if it had been part of the original scene displayed by the image sequence;
wherein said applying step comprises all applied geometric transformations of the dynamically changing visual content, is performed without reference to any real-time image content contained in the image sequence, is performed with reference to a view model that resulted beforehand from training that used camera sensor data, and is performed without reference to any three dimensional real world space locations as related to the image sequence.

31. The method of claim 30:
wherein a portion of the dynamically changing visual content is placed into an input image within the image sequence; and
comprising the additional steps of:
referencing a dynamic scene component model set which contains a three dimensional model for each of a subset of objects present in the scene that is displayed by the image sequence;
receiving camera sensor data corresponding to the input image;
selecting one scene component model out of the scene component model set; and
filling a graphics frame buffer (GFB) with updated pixel data; and
wherein the transforming step comprises:
transforming the selected scene component model such that, when inserted into the input image, the selected scene will appear as if it had been part of the original scene displayed by the input image, thus creating an input embedded model; and
texturing the input embedded model with said GFB, thus creating an input embedded GFB model; and
wherein the blending step comprises blending the input embedded GFB model with the input image such that the input embedded GFB model appears as if the input embedded GFB model had been part of the original scene displayed by the input image, thus creating a blended image; and
wherein the method also comprises the step of transmitting either the input image or the blended image, according to a selection of a user.

32. The method of claim 31, wherein the scene component model set includes:
a first model of a three dimensional surface representing the shape of a first area upon which the dynamically changing visual content may be placed; and
a second model of a three dimensional surface representing the shape of a second area upon which the dynamically changing visual content may be placed.

33. The method of claim 32:
wherein the selecting step comprises:
periodically receiving a user-specified location value for the dynamically changing visual content, wherein the value has been received via a direct input on an image from the image sequence; and
choosing a scene component model from the first model and the second model, depending on the physical shape of the user-specified location, thus yielding the selected scene component model;
wherein the dynamically changing visual content has been rendered by a general purpose graphics rendering device; and wherein the filling step comprises copying the dynamically changing visual content into the GFB.

34. A method of transforming a first point P[A] within a first two-dimensional camera view to a second point P[B] within a second two-dimensional camera view, such that the point P[A] corresponds to the same location within real world space as the point P[B], comprising:

applying a transform function to transform a first point P[A] within a first image to a second point P[B] within a second image;

wherein the first image contains content related to a first camera view;

wherein the second image contains content related to a second camera view;

wherein the point P[A] corresponds to the same location within real world space as point P[B];

wherein the applying step is performed without reference to any content contained in the first image and the second image;

wherein the applying step is performed with reference to a model that resulted from training; and wherein the applying step is further performed without reference to any three-dimensional real world space locations or dimensions as related to the content of the first image and the second image.

35. The method of claim 34, wherein the transform function uses parameters comprising:

a set of fixed transform parameters;

first camera sensor data received from a first camera corresponding to the first camera view;

second camera sensor data received from a second camera corresponding to the second camera view;

a set of dynamic transform parameters that are based on the fixed transform parameters, the first camera sensor data and the second camera sensor data.

36. The method of claim 35, wherein the first and second camera sensor data include:

pan information;
tilt information;
zoom information; and
focus information.

37. The method of claim 35, wherein the fixed transform parameters have been determined by a method comprising:

receiving an image sequence from a live camera that is outfitted with camera sensors;

receiving a stream of camera sensor data from the attached camera sensors, wherein the stream of camera sensor data comprises camera sensor information applicable to images within the image sequence;

receiving selections from a user, via direct input on one or more of the images, of multiple points of interest within 2D camera view space, wherein the selections have been received at multiple levels of camera zoom and focus;

correlating, in time, each of the images for which selections were made and each of the user selections to the stream of camera sensor data;

determining, based on the user selections and the stream of camera sensor data, a set of zoom/focus transform parameters to be included within the set of fixed transform parameters;

receiving selections from a user, via direct input on one or more images, of multiple points of interest within two-dimensional camera view space; wherein the selections have been received at multiple levels of camera pan and camera tilt;

correlating, in time, each of the images for which selections were made and each of the user selections to the first and second camera sensor data; and determining, based on the user selections, and the stream of camera sensor data, a set of other parameters to be included within the set of fixed transform parameters.

38. The method of claim 37, wherein the first and second camera sensor data includes:

pan information;
tilt information;
zoom information; and
focus information.

* * * * *